United States Patent
Sato

(10) Patent No.: US 10,257,522 B2
(45) Date of Patent: Apr. 9, 2019

(54) IMAGE DECODING DEVICE, IMAGE DECODING METHOD, IMAGE ENCODING DEVICE, AND IMAGE ENCODING METHOD

(71) Applicant: SONY CORPORATION, Minato-ku (JP)

(72) Inventor: Kazushi Sato, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 431 days.

(21) Appl. No.: 14/384,831

(22) PCT Filed: May 10, 2013

(86) PCT No.: PCT/JP2013/063116
§ 371 (c)(1),
(2) Date: Sep. 12, 2014

(87) PCT Pub. No.: WO2014/002619
PCT Pub. Date: Jan. 3, 2014

(65) Prior Publication Data
US 2015/0023407 A1    Jan. 22, 2015

(30) Foreign Application Priority Data

Jun. 25, 2012  (JP) ................................. 2012-141652

(51) Int. Cl.
*H04N 19/167* (2014.01)
*H04N 19/17* (2014.01)
(Continued)

(52) U.S. Cl.
CPC .......... *H04N 19/17* (2014.11); *H04N 19/105* (2014.11); *H04N 19/167* (2014.11); *H04N 19/30* (2014.11); *H04N 19/44* (2014.11); *H04N 19/55* (2014.11); *H04N 19/70* (2014.11); *H04N 19/119* (2014.11); *H04N 19/527* (2014.11); *H04N 19/61* (2014.11)

(58) Field of Classification Search
CPC ..................................................... H04N 19/44
See application file for complete search history.

(56) References Cited

U.S. PATENT DOCUMENTS

2007/0025442 A1*  2/2007  Okada ................... H04N 19/52
                                                      375/240.03
2007/0025444 A1   2/2007  Okada et al.
(Continued)

FOREIGN PATENT DOCUMENTS

JP          2007-36889         2/2007

OTHER PUBLICATIONS

International Search Report dated Aug. 6, 2013 in PCT/JP2013/063116.
(Continued)

*Primary Examiner* — Dave Czekaj
*Assistant Examiner* — Berteau Joisil
(74) *Attorney, Agent, or Firm* — Xsensus, LLP

(57) ABSTRACT

Provided is an image decoding device including an acquisition section configured to acquire a first parameter indicating which tile is a region-of-interest tile from an encoded stream encoded by partitioning an image into a plurality of tiles, and a decoding section configured to decode at least one of the region-of-interest tile and a non-region-of-interest tile of the image based on the first parameter acquired by the acquisition section.

19 Claims, 26 Drawing Sheets

(51) Int. Cl.
*H04N 19/44* (2014.01)
*H04N 19/105* (2014.01)
*H04N 19/70* (2014.01)
*H04N 19/30* (2014.01)
*H04N 19/55* (2014.01)
*H04N 19/119* (2014.01)
*H04N 19/61* (2014.01)
*H04N 19/527* (2014.01)

(56) References Cited

U.S. PATENT DOCUMENTS

2008/0225116 A1* 9/2008 Kang .................. H04N 21/235
    348/135
2013/0101035 A1* 4/2013 Wang .................. H04N 19/70
    375/240.12

OTHER PUBLICATIONS

Ye-Kui Wang, et al., "Tile groups", Qualcomm Incorporated, Joint Collaborative Team on Video Coding (JCT-VC) of ITU-T SG16 WP3 and ISO/IEC JTC1/SC29/WG11, Document: JCTVC-G318, Nov. 21-30, 2011, 11 pages.

Danny Hong, et al., "Scalability Support in HEVC", Vidyo, Inc., Joint Collaborative Team on Video Coding (JCT-VC) of ITU-T SG16 WP3 and ISO/IEC JTC1/SC29/WG11, Document: JCTVC-F290, Jul. 14-22, 2011, 15 pages.

Extended Search Report dated Mar. 21, 2016 in European Patent Application No. 13808767.1.

Dan Grois, et al., "Recent Advances in Region-of-interest Video Coding", Recent Advances on Video Coding, Jul. 5, 2011, XP055257835, 29 pages.

Office Action dated Apr. 18, 2017, in Japanese Patent Application No. 2014-522473.

Ye-Kui Wang, et al., "Tile groups", Qualcomm Incorporated, Joint Collaborative Team on Video Coding (JCT-VC) of ITU-T SG16 WP3 and ISO/IEC JTC1/SC29/WG11, Document: JCTVC-G318, Nov. 21-30, 2011, 10 pages (including cover), Date Saved: Nov. 9, 2011.

Danny Hong, et al., "Scalability Support in HEVC", Vidyo, Inc., Joint Collaborative Team on Video Coding (JCT-VC) of ITU-T SG16 WP3 and ISO/IEC JTC1/SC29/WG11, Document: JCTVC-F290, Jul. 14-22, 2011, 16 pages (including cover), Date Saved: Jul. 12, 2011.

Japanese Office Action dated Oct. 10, 2017 in Patent Application No. 2014-522473.

Ohji Nakagami et al., "Bitstream Restriction Flag to Enable Tile Split", Sony Corporation, Joint Collaborative Team on Video Coding (JCT-VC) of ITU-T SG16 WP3 and ISO/IEC JTC1/SC 29/WG11, 9th Meeting; Geneva, CH, Document: JCTVC-I0056, Apr. 27-May 7, 2012, 4 pages (including cover page).

* cited by examiner

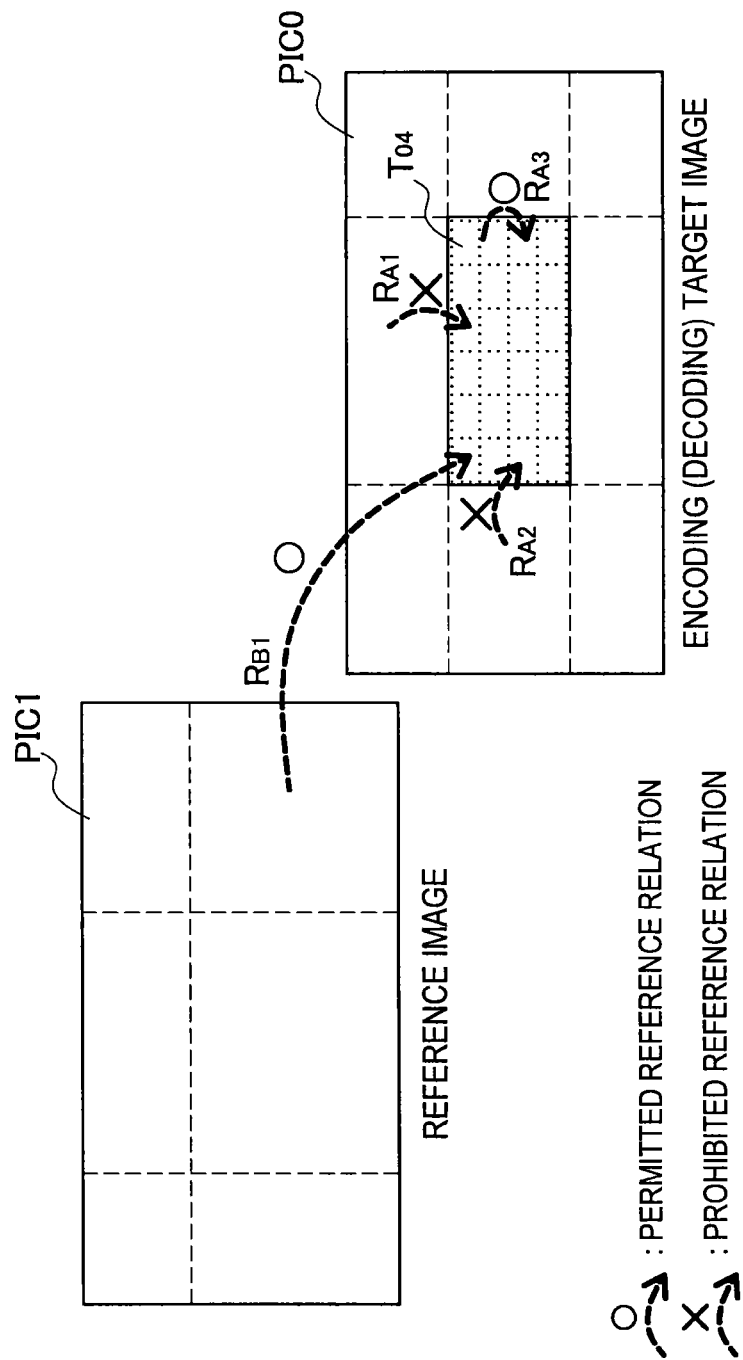

: ROI Tile   : non-ROI Tile

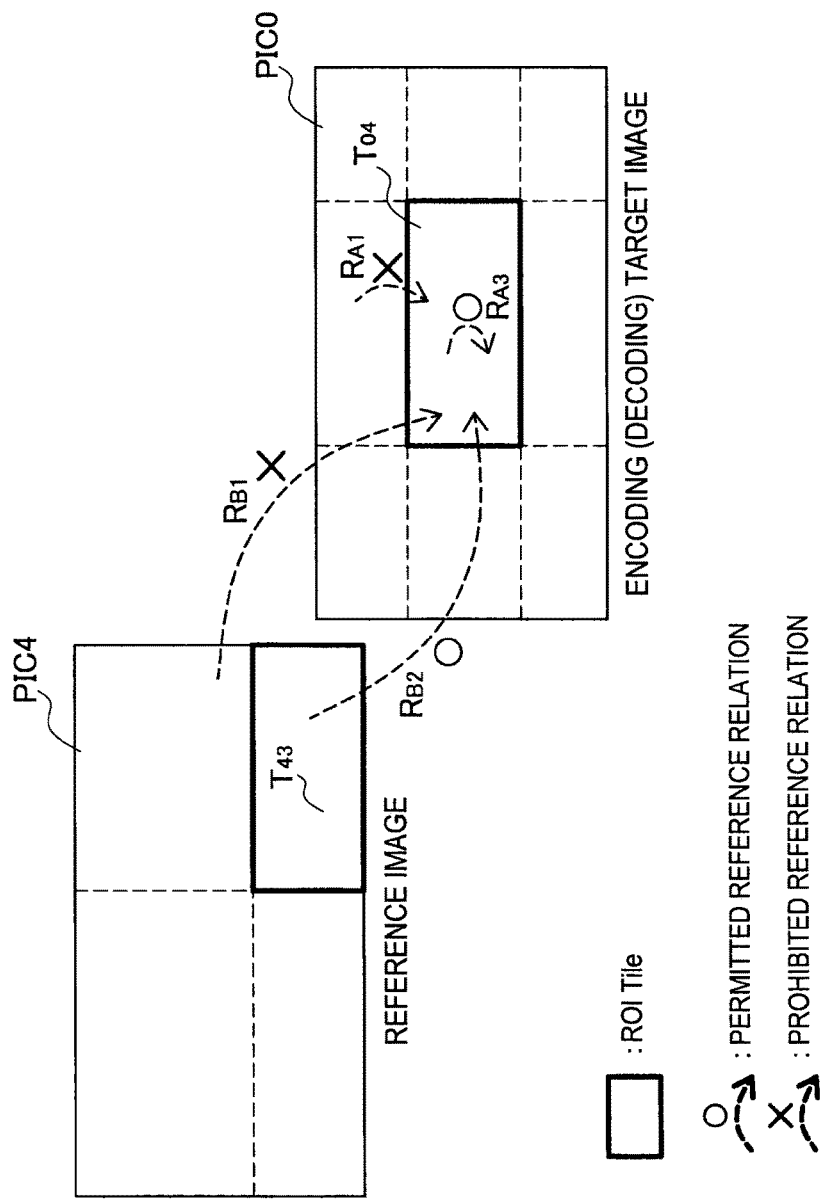

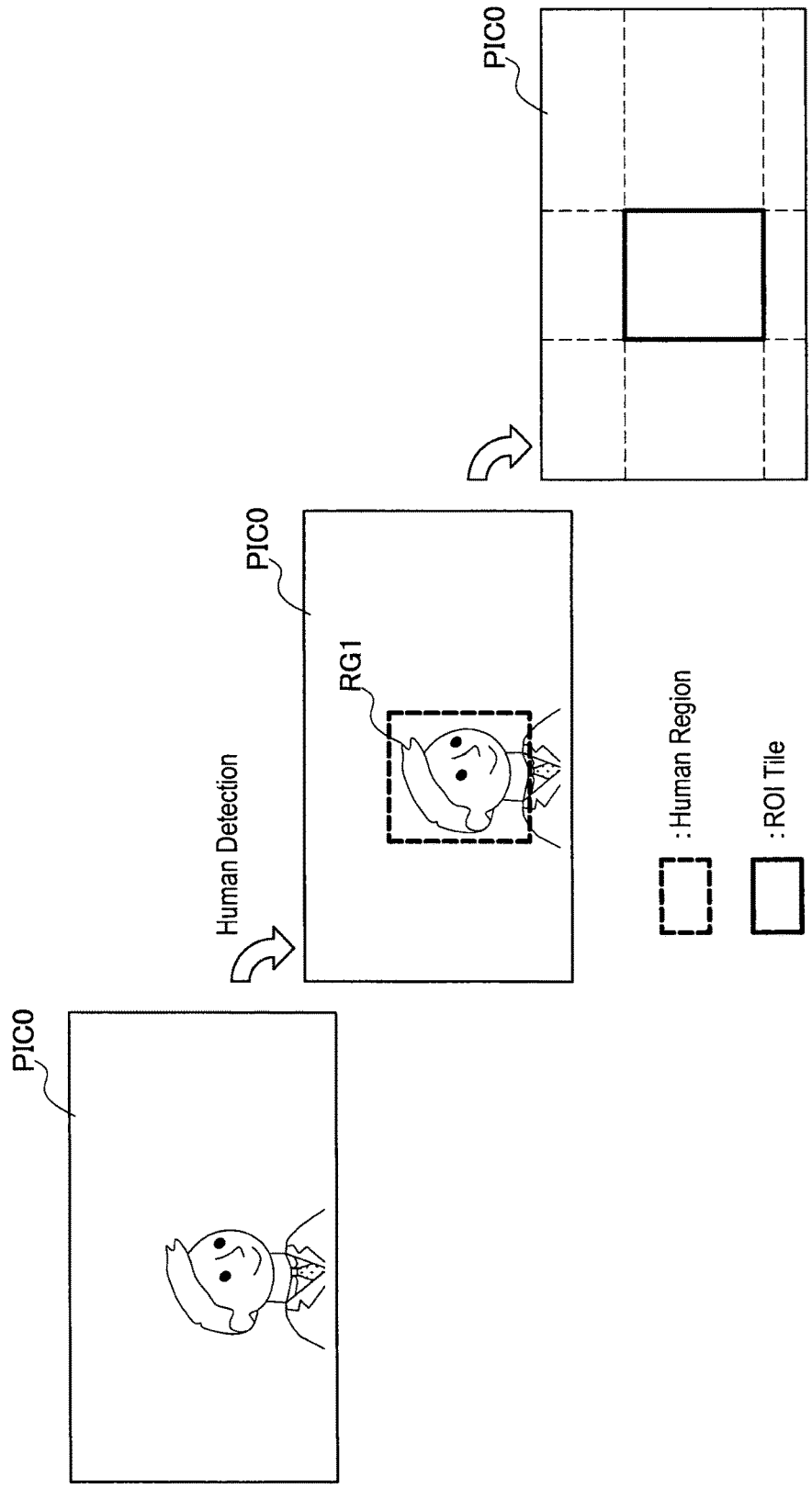

FIG.6A
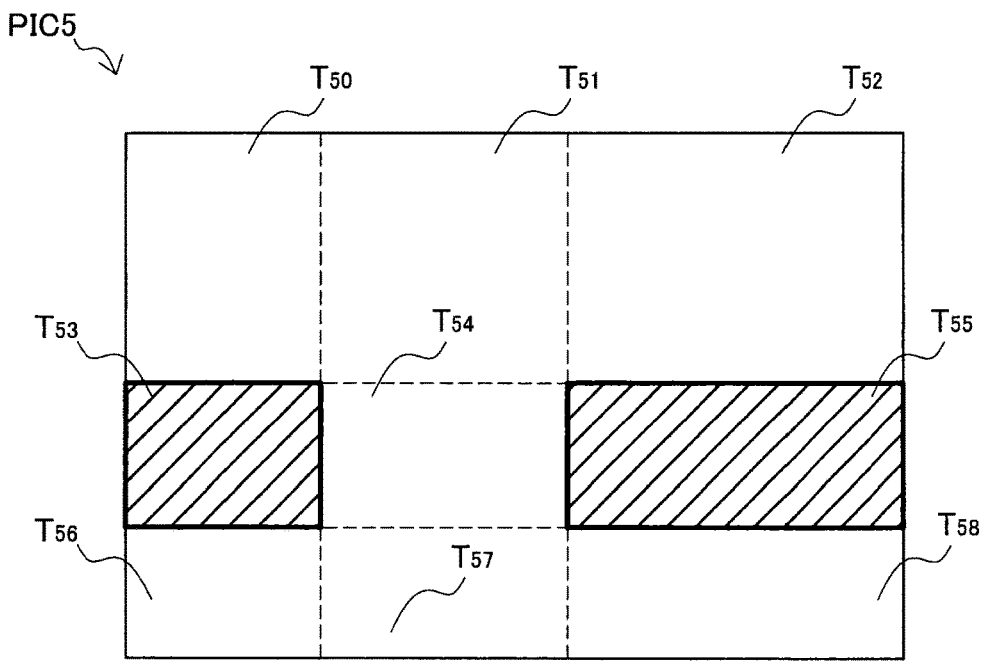
FIG.6B
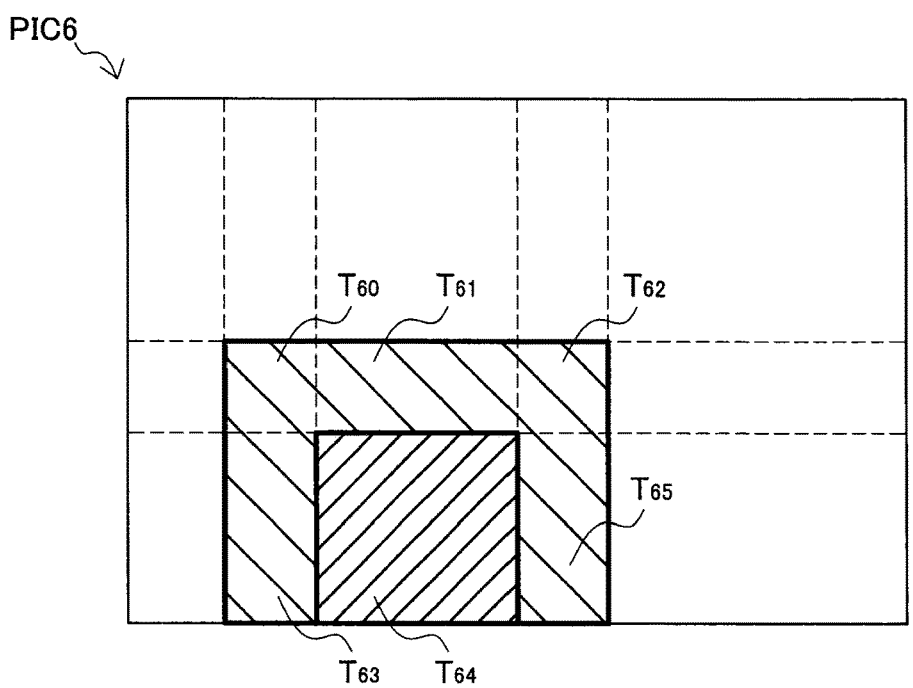
 : 1st level ROI Tile     : 2nd level ROI Tile

IMAGE DECODING DEVICE, IMAGE DECODING METHOD, IMAGE ENCODING DEVICE, AND IMAGE ENCODING METHOD

TECHNICAL FIELD

The present disclosure relates to an image decoding device, an image decoding method, an image encoding device, and an encoding method.

BACKGROUND ART

The standardization of an image coding scheme called HEVC (High Efficiency Video Coding) by JCTVC (Joint Collaboration Team-Video Coding), which is a joint standardization organization of ITU-T and ISO/IEC, is currently under way for the purpose of improving coding efficiency more than H.264/AVC. For the HEVC standard, Committee draft as the first draft specifications was issued in February, 2012 (see, for example, Non-Patent Literature 1 below).

In standardization of HEVC, methods of partitioning an image into a plurality of tiles and performing an encoding process and a decoding process on each tile have been suggested (see, for example, Non-Patent Literature 2 below). The tile partitioning enables an advanced parallel process performed to improve a processing speed to be performed and matching with a MTU (Maximum Transmission Unit) size of a transmitted encoded stream to be performed easily.

CITATION LIST

Non-Patent Literature

Non-Patent Literature 1: Benjamin Bross, Woo-Jin Han, Jens-Rainer Ohm, Gary J. Sullivan, Thomas Wiegand, "High efficiency video coding (HEVC) text specification draft 6" (JCTVC-H1003 ver20, Feb. 17, 2012)

Non-Patent Literature 2: Arild Fuldseth, Michael Horowitz, Shilin Xu, Andrew Segall, Minhua Zhou, "Tiles" (JCTVC-F335, 6th Meeting: Torino, IT, Jul. 14 to 22, 2011)

SUMMARY OF INVENTION

Technical Problem

When an HEVC scheme is introduced, high-resolution images can be compressed with high coding efficiency, so that the compressed images can be transmitted or accumulated. However, all of the terminals do not necessarily have an ability to handle high-resolution images. Accordingly, in order to provide high-resolution images to terminals with high abilities and provide low-resolution images to terminals with relatively low abilities, it is beneficial to realize so-called partial decoding. The foregoing tile partitioning can be said to be proper for the partial decoding in that a decoding process is performed separately tile by tile. However, a structure enabling the partial decoding using the tile partitioning has not yet been suggested.

Solution to Problem

According to the present disclosure, there is provided an image decoding device including an acquisition section configured to acquire a first parameter indicating which tile is a region-of-interest tile from an encoded stream encoded by partitioning an image into a plurality of tiles, and a decoding section configured to decode at least one of the region-of-interest tile and a non-region-of-interest tile of the image based on the first parameter acquired by the acquisition section.

Further, according to the present disclosure, there is provided an image decoding method including acquiring a first parameter indicating which tile is a region-of-interest tile from an encoded stream encoded by partitioning an image into a plurality of tiles, and a decoding section configured to decode at least one of the region-of-interest tile and a non-region-of-interest tile of the image based on the acquired first parameter.

Further, according to the present disclosure, there is provided an image encoding device including a partitioning section configured to partition an image into a plurality of tiles including a region-of-interest tile, and an encoding section configured to insert a first parameter indicating which tile is the region-of-interest tile into an encoded stream generated by encoding the image for each of the tiles.

Further, according to the present disclosure, there is provided an image encoding method including partitioning an image into a plurality of tiles including a region-of-interest tile, and inserting a first parameter indicating which tile is the region-of-interest tile into an encoded stream generated by encoding the image for each of the tiles.

Advantageous Effects of Invention

According to a technology in the present disclosure, a structure enabling the partial decoding is realized by using the tile partitioning.

BRIEF DESCRIPTION OF DRAWINGS

FIG. 2 is an explanatory diagram illustrating restriction of a reference relation imposed on tiles in a method of the related art.

FIG. 4 is an explanatory diagram illustrating restriction of a reference relation imposed on tiles in an embodiment.

FIG. 5 is an explanatory diagram illustrating an example of a method of setting an ROI tile in an image.

FIG. 6A is an explanatory diagram illustrating a third example of an ROI tile.

FIG. 6B is an explanatory diagram illustrating a fourth example of an ROI tile.

DESCRIPTION OF EMBODIMENTS

Hereinafter, preferred embodiments of the present invention will be described in detail with reference to the appended drawings. Note that, in this specification and the drawings, elements that have substantially the same function and structure are denoted with the same reference signs, and repeated explanation is omitted.

The description will be made in the following order.
1. Overview
1-1. Structure of tile partitioning
1-2. Introduction of ROI (region of interest) tile
1-3. Tile partitioning based on detection of ROI
1-4. Variation in ROI tile
2. First embodiment
2-1. Example of configuration of encoder
2-2. Example of configuration of stream
2-3. Process flow at the time of encoding
2-4. Example of configuration of decoder
2-5. Process flow at the time of decoding
3. Second embodiment
3-1. Example of configuration of encoder
3-2. Example of configuration of stream
3-3. Process flow at the time of encoding
3-4. Example of configuration of decoder
3-5. Process flow at the time of decoding
4. Application examples
5. Conclusion <1. Overview>

[1-1. Structure of Tile Partitioning]

According to the structure of tile partitioning described in Non-Patent Literature 2 above, one picture is allowed to be partitioned into a plurality of rectangular tiles. Tile sizes may be uniform or may be non-uniform in the picture. The tile partitioning is decided according to the number of tile columns, the number of tile rows, the width of each tile column, and the height of each tile row. When the tile sizes are uniform, the number of tile columns and the number of tile rows are designated in an SPS (Sequence Parameter Set) or a PPS (Picture Parameter Set). In this case, the width of the tile column and the height of the tile row can be decided by dividing the width and the height of the picture by the number of tile columns and the number of tile rows, respectively. When the tile sizes are non-uniform, the width of each tile column and the height of each tile row are designated in addition to the number of tile columns and the number of tile rows in the SPS or the PPS. A flag indicating whether the tile sizes are uniform is also designated in the SPS or the PPS. One slice may include at least one tile.

Figure 1:
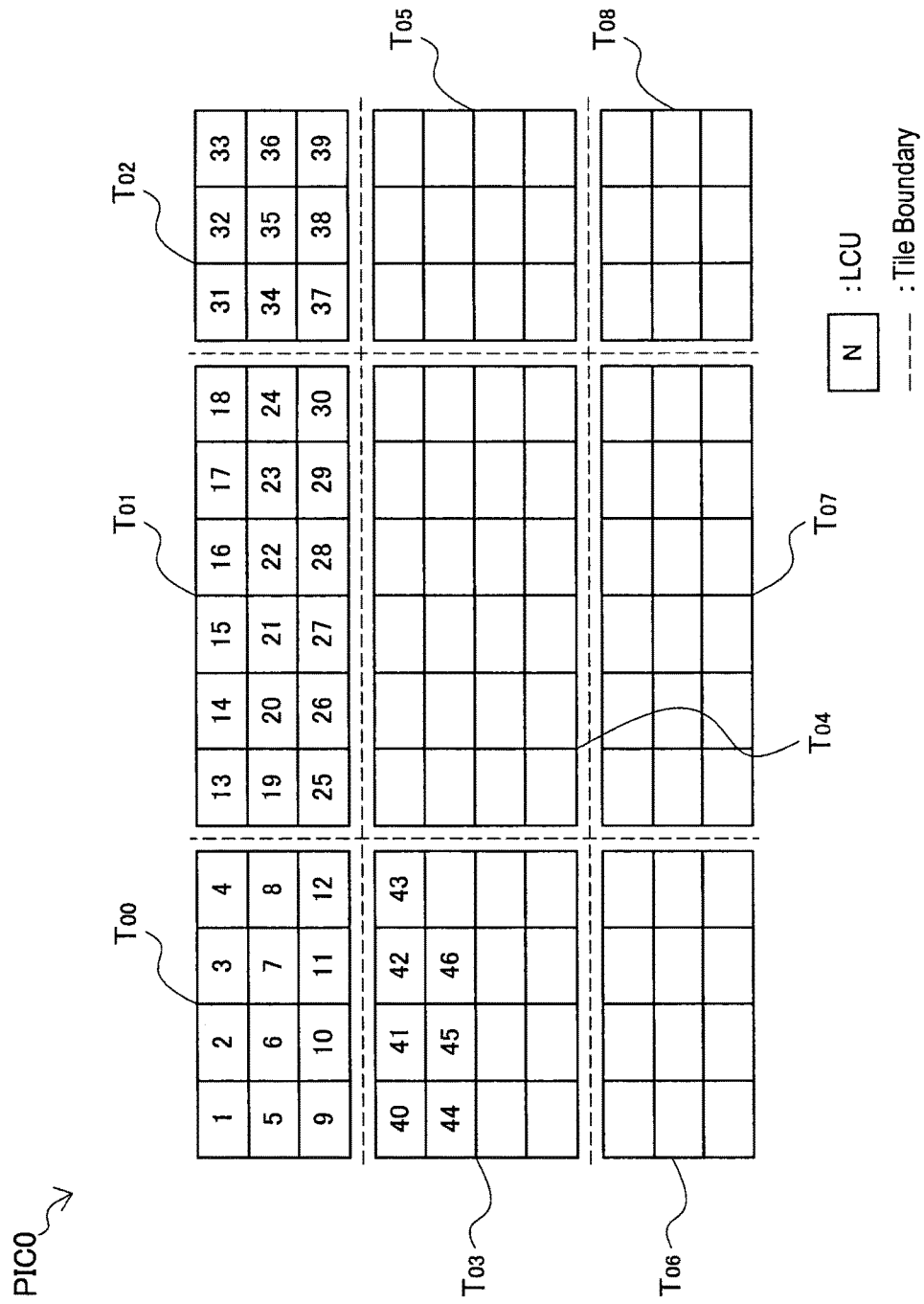
FIG. 1 is an explanatory diagram illustrating an example of tile partitioning.

FIG. 1 is an explanatory diagram illustrating an example of tile partitioning. Referring to FIG. 1, a picture PIC0 is partitioned into 9 tiles $T_{00}$ to $T_{08}$ having non-uniform sizes. The left upper tile $T_{00}$ includes 4×3=12 LCUs (LCU1 to LCU12). The middle upper tile $T_{01}$ includes 6×3=18 LCUs (LCU13 to LCU30). The right upper tile $T_{02}$ includes 3×3=9 LCUs (LCU31 to LCU39). The middle left tile $T_{03}$ includes 4×4=16 LCUs. The middle tile $T_{04}$ includes 6×4=24 LCUs. The middle right tile $T_{05}$ includes 3×4=12 LCUs. The left lower tile $T_{06}$ includes 4×3=12 LCUs. The middle lower tile $T_{07}$ includes 6×3=18 LCUs. The right lower tile $T_{08}$ includes 3×3=9 LCUs.

An LCU (Largest Coding Unit) in each tile is processed in a raster scanning order. For example, 12 LCUs in the tile $T_{00}$ are processed in increasing order of the numbers appended to the LCUs. The tiles in the picture are processed in the raster scanning order in principle. However, since reference between the tiles is prohibited in intra prediction, the plurality of tiles in the same picture can be decoded in parallel. For example, the tile sizes may be decided according to a condition such as the parallel processing performance of a decoder or an MTU size of an encoded stream to be transmitted.

FIG. 2 is an explanatory diagram illustrating restriction of a reference relation imposed on tiles in a method of the related art. Referring to FIG. 2, a picture PIC0 which is an encoding (decoding) target image and a picture PIC1 which is a reference image of the picture PIC0 are illustrated. The picture PIC0 is partitioned into a plurality of tiles including a tile $T_{04}$. The picture PIC1 is also partitioned into a plurality of tiles. When intra prediction is performed in a PU (Prediction Unit) in the tile $T_{04}$, pixels of other tiles in the picture PIC0 are prohibited from being used as reference pixels (arrows $R_{41}$ and $R_{42}$). A pixel in the same tile is permitted to be used as a reference pixel (arrow $R_{43}$). The same restriction of a prediction mode as the restriction imposed on the PU of a slice end is imposed on the PU of a tile end. However, compared to slices, the tiles normally have a shape closer to a square. Therefore, by using the tiles rather than the slices, deterioration in prediction accuracy caused due to the restriction of the prediction mode is alleviated. When inter prediction is performed, a pixel of a certain tile of the picture PIC1 is also permitted to be used as a reference pixel (arrow $R_{B1}$).

Incidentally, an increase in the resolution of a video content has progressed each year. An HEVC scheme is an image coding scheme proper for compression of a high-resolution image with high coding efficiency. However, all of the currently used terminals and the terminals to be used in the future do not necessarily have an ability to handle high-resolution images. For example, excessively high resolutions are rather disadvantageous for terminals having processors with low processing performance, terminals receiving images through communication channels with narrow bandwidths, or terminals including displays with low resolutions. Accordingly, in order to provide high-resolution images to terminals having high abilities and provide low-resolution images to terminals having relatively low abilities, it is advantageous to realize so-called partial decoding. The tile partitioning is proper for the partial decoding in that a decoding process is performed separately tile by tile. Accordingly, a technology in the present disclosure provides a structure enabling partial decoding by using the above-describing tile partitioning.

[1-2. Introduction of ROI (Region of Interest) Tile]

In the present specification, a region decoded through partial decoding in an entire image is referred to as an ROI (Region of Interest). A region other than the ROI in the image is referred to a non-ROI (non-region of Interest). The ROI generally refers to a region which is particularly focused on in an individual use of an image. For example, a human region detected in an image may be set as an ROI in a use of a monitoring camera video. Further, a speaker region detected in an image may be set as an ROI in a use of a video conference.

Figure 3A:
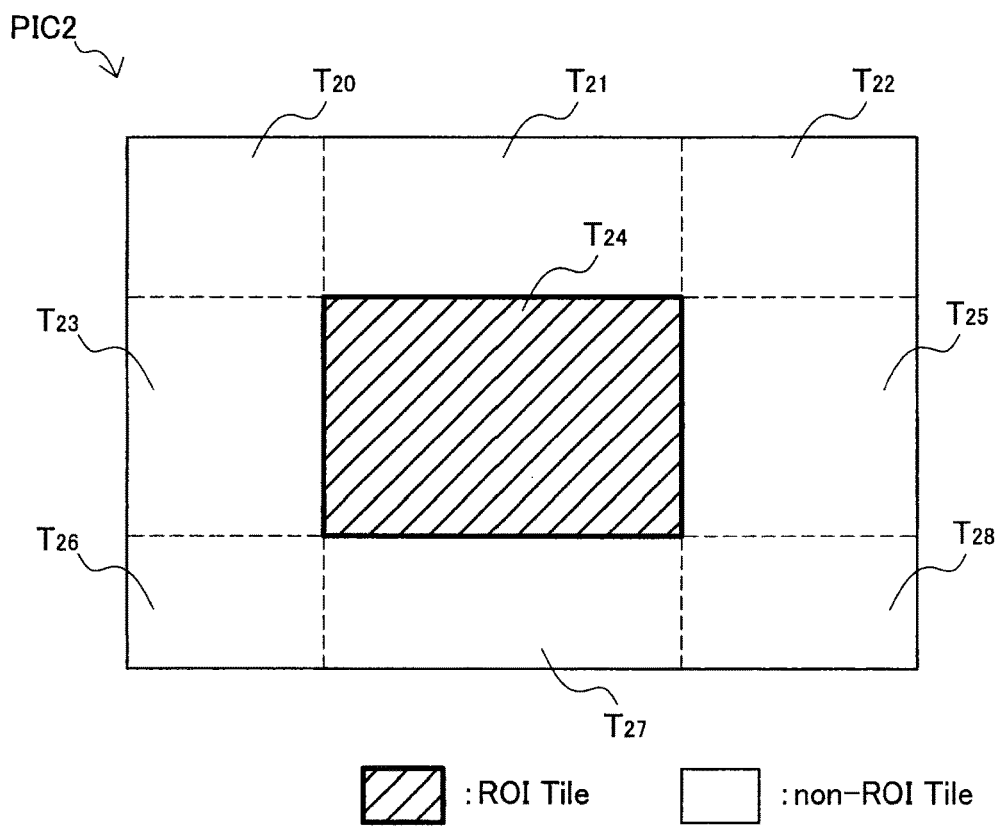
FIG. 3A is an explanatory diagram illustrating a first example of an ROI (region of interest) tile which can be set in an embodiment.
Figure 3B:
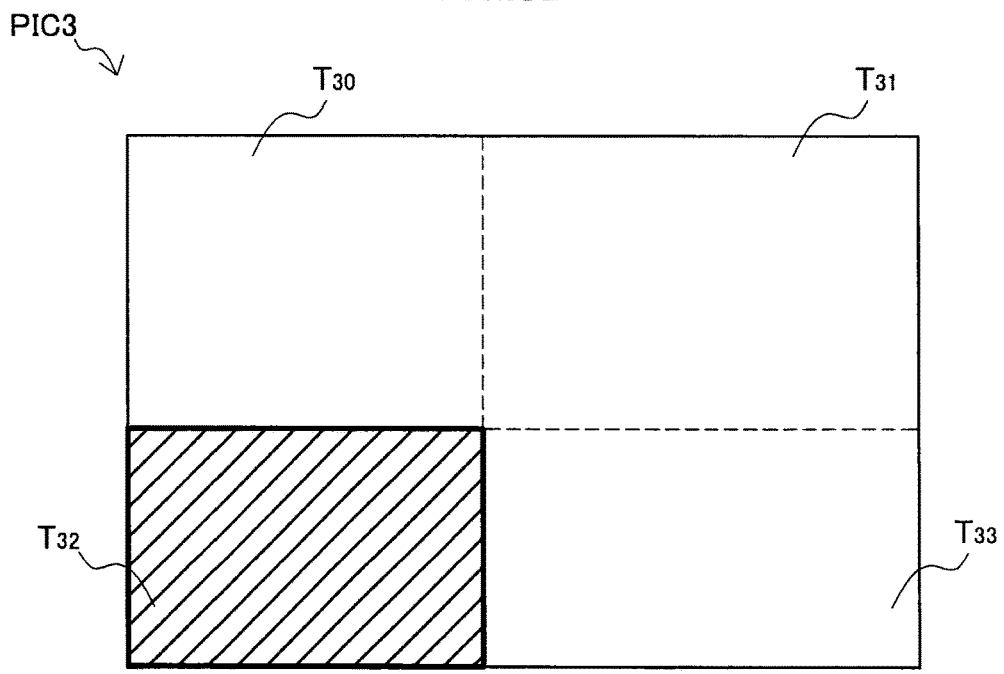
FIG. 3B is an explanatory diagram illustrating a second example of an ROI tile which can be set in an embodiment.

In the technology in the present disclosure, the tile partitioning is decided according to the position of an ROI set in an image. As one example, referring to FIG. 3A, a rectangular ROI hatched by diagonal lines is set in the middle of a picture PIC2. A tile boundary is formed along the edge of the ROI. As a result, the picture PIC2 is partitioned into 9 tiles $T_{20}$ to $T_{28}$. The tile $T_{24}$ is the ROI tile. The tiles $T_{20}$ to $T_{23}$ and $T_{25}$ to $T_{28}$ are non-ROI tiles. As another example, referring to FIG. 3B, a rectangular ROI hatched by diagonal lines is set to come into contact with the lower left corner of a picture PIC3. A tile boundary is formed along the edge of the ROI. As a result, the picture PIC3 is partitioned into 4 tiles $T_{30}$ to $T_{33}$. The tile $T_{32}$ is an ROI tile. The tiles $T_{30}$, $T_{31}$, and $T_{33}$ are non-ROI tiles.

In the technology in the present disclosure, to partially decode only an ROI tile, restriction of a new reference relation is imposed on tiles.

FIG. 4 is an explanatory diagram illustrating the restriction of a reference relation imposed on tiles in an embodiment. Referring to FIG. 4, a picture PIC0 which is an encoding (decoding) target image and a picture PIC4 which is a reference image of the picture PIC0 are illustrated. The picture PIC0 is partitioned into a plurality of tiles including a tile $T_{04}$. The tile $T_{04}$ is an ROI tile of the picture PIC0. The picture PIC4 is partitioned into a plurality of tiles including a tile $T_{43}$. The tile $T_{43}$ is an ROI tile of the picture PIC4. When intra prediction is performed in the PU in the ROI tile $T_{04}$, a pixel of the non-ROI tile in the picture PIC0 is prohibited from being used as a reference pixel (arrow $R_{A1}$). Likewise, a pixel in the ROI tile is permitted to be used as a reference pixel (arrow $R_{A3}$). When inter prediction is performed in the PU in the ROI tile $T_{04}$, a pixel of the non-ROI tile in the picture PIC4 is prohibited from being used as a reference pixel (arrow $R_{B1}$). A pixel of the ROI tile $T_{43}$ in the picture PIC4 is permitted to be used as a reference pixel (arrow $R_{B2}$).

The restriction of the reference relation imposed on the non-ROI tiles may be the same as the method of the related art described with reference to FIG. 2. That is, when the intra prediction is performed in the PU in the non-ROI tile, a pixel of another tile is prohibited from being used as a reference pixel and a pixel of the same tile is permitted to be used as a reference pixel. When the inter prediction is performed in the PU in the non-ROI tile, pixels of both of the ROI tile and the non-ROI tile of the reference image are permitted to be used as reference pixels.

By introducing the above-described restrictions on the ROI tile, a decoder does not refer to the non-ROI tile at all when the decoder decodes the ROI tile. As a result, a series of partial images displaying only the ROI tiles can be decoded from an encoded stream. Two embodiments of an encoder and a decoder capable of performing such partial decoding will be described in detail below.

[1-3. Tile Partitioning Based on Detection of ROI]

FIG. 5 is an explanatory diagram illustrating an example of a method of setting an ROI tile in an image. Referring to the left upper portion of FIG. 5, a human being is pictured in an encoding target image PIC0. The human being is recognized, for example, by applying a human detection method of the related art, such as a feature amount matching method, a background differential extraction method, or a skin color region extraction method, to the encoding target image PIC0. In the example of FIG. 5, a human region RG1 detected as a result of a human detection process is set as an ROI (Region of Interest). The tile partitioning is decided according to the position of the set ROI. For example, the image may be partitioned so that the upper, lower, right, and left edges of the rectangular ROI accord with a tile boundary. The position of the tile boundary may be adjusted so that the sizes of the ROI tiles are the same in the plurality of images. Referring to the right lower portion of FIG. 5, the encoding target image PIC0 is partitioned into 9 tiles so that the edges of the human region RG1 accord with the tile boundary.

[1-4. Variation in ROI Tile]

The examples in which one ROI tile is set in one image have been mainly described above. However, embodiments of the present disclosure are not limited to these examples, and a plurality of ROI tiles may be set in one image.

Referring to FIG. 6A, a picture PIC5 is partitioned into 9 tiles $T_{50}$ to $T_{58}$. The tiles $T_{53}$ and $T_{55}$ are ROI tiles. The tiles $T_{50}$ to $T_{52}$, $T_{54}$, and $T_{56}$ to $T_{58}$ are non-ROI tiles. In this way, two or more mutually independent ROI tiles may be set in one image. To recognize which ROI of a certain picture corresponds to which ROI of a subsequent picture, each ROI can be tracked through a plurality of images. When intra prediction is performed in the PU in the ROI tile, a pixel of another ROI tile in the same picture is prohibited from being used as a reference pixel. When inter prediction is performed in the PU in the ROI tile, a pixel of the ROI tile corresponding to the reference image is permitted to be used as a reference pixel and pixels of the other ROI tile and the non-ROI tile of the reference image are prohibited from being used as reference pixels.

Referring to FIG. 6B, a picture PIC6 is partitioned into 15 tiles including ROI tiles $T_{60}$ to $T_{65}$. The ROI tile $T_{64}$ is a 1st level ROI tile. The ROI tiles $T_{60}$ to $T_{63}$ and $T_{65}$ are 2nd level ROI tiles. The 1st level ROI tile corresponds to a region which is most focused on in an individual use of an image. The 2nd level ROI tiles correspond to a region which is broader than a region surrounding the 1st level ROI. In this way, the ROI tiles corresponding to the ROIs with a plurality of levels with different areas may be set in one image. For example, a 1st level ROI may be a face region of a human being and a 2nd level ROI may be a region of the whole body of a human being. When inter prediction is performed in the PU in the ROI tile, a pixel of the ROI tile with the same level as the reference image or a higher level than the reference image is permitted to be used as a reference image and pixels of the ROI tile of a lower level and the non-ROI tile are prohibited from being used as reference pixels.

In two embodiments to be described in the subsequent section, one highest ROI tile is assumed to be set in one image for the sake of brevity of description.

<2. First Embodiment>

In a first embodiment, both of an ROI tile and a non-ROI tile are assumed to be encoded in one encoded stream.

[2-1. Example of Configuration of Encoder]

(1) Overall Configuration

Figure 7:
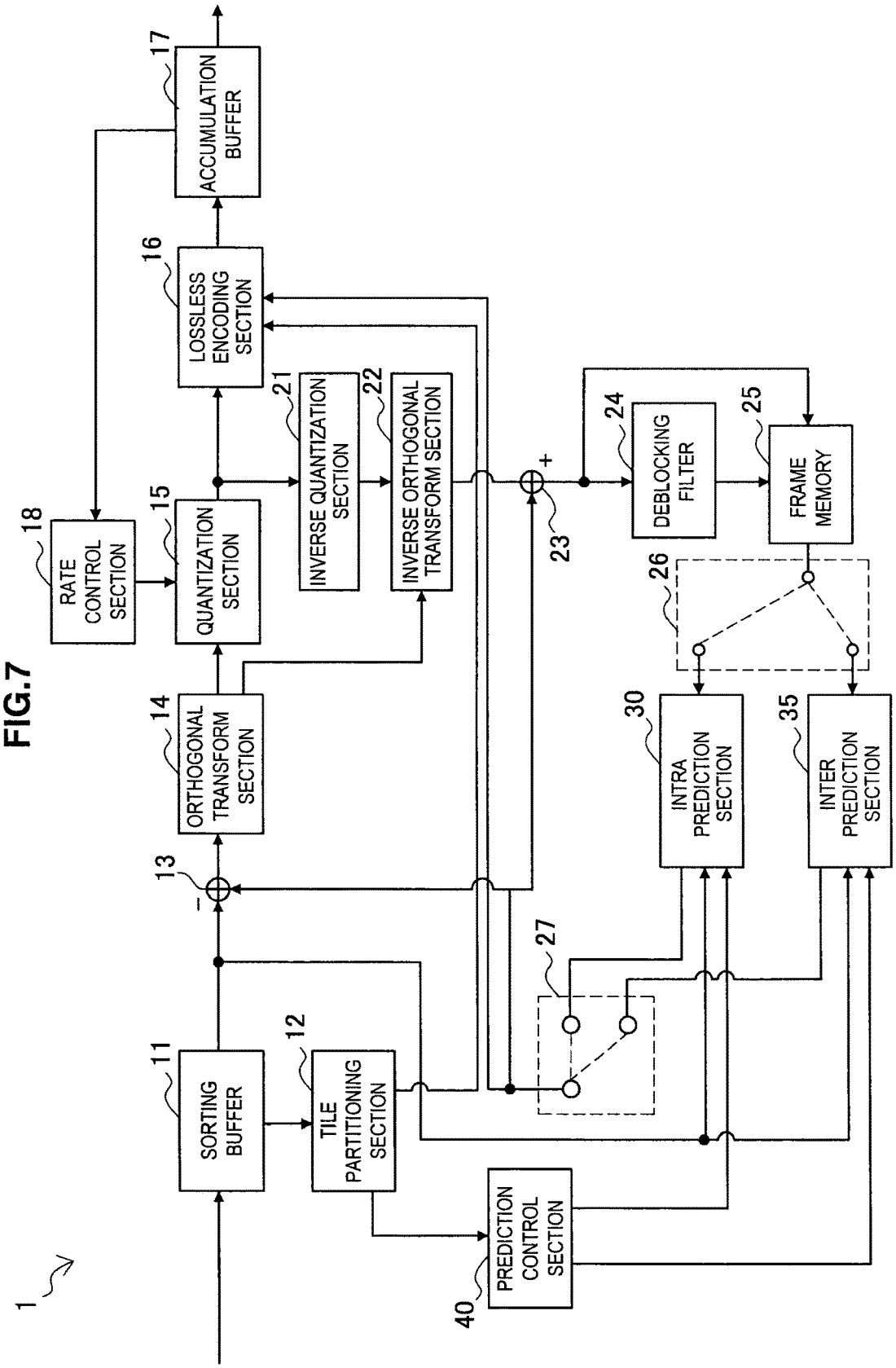
FIG. 7 is a block diagram showing an example of the configuration of an image encoding device according to a first embodiment.

FIG. 7 is a block diagram showing an example of the configuration of an image encoding device 1 according to the first embodiment. Referring to FIG. 7, the image encoding device 1 includes a sorting buffer 11, a tile partitioning section 12, a subtraction section 13, an orthogonal transform section 14, a quantization section 15, a lossless encoding section 16, an accumulation buffer 17, a rate control section 18, an inverse quantization section 21, an inverse orthogonal transform section 22, an addition section 23, a deblocking filter 24, a frame memory 25, selectors 26 and 27, an intra prediction section 30, an inter prediction section 35, and a prediction control section 40.

A series of original image data with a digital format is input to the sorting buffer 11. Each image included in the original image data is an encoding target image. The sorting buffer 11 sorts the images included in the original image data in an encoding/decoding order according to a GOP (Group of Pictures) structure. Then, the sorting buffer 11 outputs the original image data in which the encoding target images are arranged in the order after the sorting to the subtraction section 13, the intra prediction section 30, and the inter prediction section 35.

The tile partitioning section 12 partitions an encoding target image input to the sorting buffer 11 into a plurality of tiles including an ROI (Region of Interest) tile. For example, the tile partitioning section 12 can set an ROI in each image and decide the tile partitioning according to the position of the set ROI. The tile partitioning section 12 may set any kind of ROI in an image according to a use of the image. For example, the tile partitioning section 12 may perform human detection on each image and set the detected human region as an ROI. The tile partitioning section 12 generates tile parameters indicating how each image is partitioned and which tile is an ROI tile. Then, the tile partitioning section 12 outputs the generated tile parameters to the lossless encoding section 16, the intra prediction section 30, the inter prediction section 35, and the prediction control section 40. An example of the detailed configuration of the tile partitioning section 12 will be further described later.

The original image data input from the sorting buffer 11 and predicted image data to be described later are supplied to the subtraction section 13. The subtraction section 13 calculates predicted error data which is a difference between the original image data and the predicted image data and outputs the calculated predicted error data to the orthogonal transform section 14.

The orthogonal transform section 14 performs an orthogonal transform on the predicted error data input from the subtraction section 13. The orthogonal transform performed by the orthogonal transform section 14 may be, for example, a DCT (Discrete Cosine Transform) or a Karhunen-Loeve transform. The orthogonal transform section 14 outputs transform coefficient data acquired through the orthogonal transform process to the quantization section 15.

The transform coefficient data input from the orthogonal transform section 14 and a rate control signal from the rate control section 18 described later are supplied to the quantization section 15. The quantization section 15 quantizes the transform coefficient data, and outputs the transform coefficient data which has been quantized (hereinafter, referred to as quantized data) to the lossless encoding section 16 and the inverse quantization section 21. Also, the quantization section 15 switches a quantization parameter (a quantization scale) based on the rate control signal from the rate control section 18 to thereby change the bit rate of the quantized data that is input to the lossless encoding section 16.

The quantized data input from the quantization section 15 and various parameters to be inserted into a header region of the encoded stream are supplied to the lossless encoding section 16. The parameters supplied to the lossless encoding section 16 can include a tile parameter generated by the tile partitioning section 12, information regarding the intra prediction generated by the intra prediction section 30, and information regarding the inter prediction generated by the inter prediction section 35. The lossless encoding section 16 performs a lossless encoding process on the quantized data for each tile to generate an encoded stream. The lossless encoding performed by the lossless encoding section 16 may be, for example, variable-length encoding or arithmetic encoding. The lossless encoding section 16 inserts various parameters including the tile parameters into the header region of the encoded stream. Then, the lossless encoding section 16 outputs the generated encoded stream to the accumulation buffer 17.

The accumulation buffer 17 temporarily accumulates an encoded stream of the input from the lossless encoding section 16 using a storage medium such as a semiconductor memory. Then, the accumulation buffer 17 outputs the accumulated encoded stream at a rate in accordance with the band of a transmission path (or an output line from the image encoding device 1).

The rate control section 18 monitors the free space of the accumulation buffer 17. Then, the rate control section 18 generates a rate control signal according to the free space on the accumulation buffer 17, and outputs the generated rate control signal to the quantization section 15. For example, when there is not much free space on the accumulation buffer 17, the rate control section 18 generates a rate control signal for lowering the bit rate of the quantized data. Also, for example, when the free space on the accumulation buffer 17 is sufficiently large, the rate control section 18 generates a rate control signal for increasing the bit rate of the quantized data.

The inverse quantization section 21 performs an inverse quantization process on the quantized data input from the quantization section 15. Then, the inverse quantization section 21 outputs transform coefficient data acquired by the inverse quantization process to the inverse orthogonal transform section 22.

The inverse orthogonal transform section 22 performs an inverse orthogonal transform process on the transform coefficient data input from the inverse quantization section 21 to thereby restore the predicted error data. Then, the inverse orthogonal transform section 22 outputs the restored predicted error data to the addition section 23.

The addition section 23 adds the restored predicted error data input from the inverse orthogonal transform section 22 and the predicted image data input from the selector 27 to thereby generate decoded image data (also called reconstructed image data). Then, the addition section 23 outputs the generated decoded image data to the deblocking filter 24 and the frame memory 25.

The deblocking filter 24 performs a filtering process for reducing block distortion occurring at the time of encoding of an image. The deblocking filter 24 filters to remove the block distortion, and outputs the decoded image data from which the block distortion is removed after filtering to the frame memory 25.

The frame memory 25 stores, using a storage medium, the decoded image data input from the addition section 23 and the decoded image data after filtering input from the deblocking filter 24.

The selector 26 reads the decoded image data before the filtering used for the intra prediction from the frame memory 25 and supplies the read decoded image data as reference image data to the intra prediction section 30. The selector 26 reads the decoded image data after the filtering used for the inter prediction from the frame memory 25 and supplies the read decoded image data as reference image data to the inter prediction section 35.

The selector 27 switches between an intra prediction mode and an inter prediction mode. In the intra prediction mode, the selector 27 outputs the predicted image data input from the intra prediction section 30 to the subtraction section 13 and the addition section 23 and outputs information regarding the intra prediction to the lossless encoding section 16. In the inter prediction mode, the selector 27 outputs the predicted image data input from the inter prediction section 35 to the subtraction section 13 and the addition section 23 and outputs information regarding the inter prediction to the lossless encoding section 16. For example, the selector 27 may switch between the intra prediction mode and the inter prediction mode in accordance with the magnitude of a cost function value.

The intra prediction section 30 performs the intra prediction process based on the original image data input from the sorting buffer 11 and the decoded image data supplied from the selector 26. For example, the intra prediction section 30 evaluates the prediction results of the plurality of prediction modes using a predetermined cost function and selects, as an optimum prediction mode, the prediction mode in which the cost function value is the minimum. The intra prediction section 30 generates information regarding the intra prediction including prediction mode information indicating the selected optimum prediction mode. Then, the intra prediction section 30 outputs the information regarding the intra prediction, the predicted image data, and the cost function value to the selector 27.

The inter prediction section 35 performs the inter prediction process based on the original image data input from the sorting buffer 11 and the decoded image data supplied from the selector 26. For example, the inter prediction section 35 evaluates the prediction results of the plurality of prediction modes using a predetermined cost function and selects, as an optimum prediction mode, the prediction mode in which the cost function value is the minimum. The inter prediction section 35 generates information regarding the inter prediction including, prediction mode information indicating the selected optimum prediction mode, motion vector information, and reference image information. Then, the inter prediction section 35 outputs the information regarding the inter prediction, the predicted image data, and the cost function value to the selector 27.

The prediction control section 40 controls the restrictions of the reference relation imposed on the intra prediction and the inter prediction. For example, the prediction control section 40 controls the intra prediction section 30 such that the tile different from the tile to which the PU belongs is not referred to when the intra prediction is performed in each PU. When the reference image does not include the ROI tile, the prediction control section 40 does not cause the inter prediction section 35 to perform the inter prediction in the PU in the ROI tile of the encoding target image.

For example, when the inter prediction is performed in the PU in the ROI tile, the prediction control section 40 controls the inter prediction section 35 such that the non-ROI tile of the reference image is not referred to. On the other hand, when the inter prediction is performed in each PU in the non-ROI tile, the prediction control section 40 may cause the inter prediction section 35 to refer to any tile of the reference image regardless of whether any tile of the reference image is the ROI tile.

When the inter prediction is performed in the PU in the ROI tile, the inter prediction section 35 may offset the motion vector information depending on the position of the ROI tile of the reference image. Here, an offset amount can correspond to, for example, a difference between the position of the left upper end of the ROI tile of the encoding target image and the position of the left upper end of the ROI tile of the reference image. By offsetting the motion vector information in this way, it is possible to lessen a motion of the ROI from the motion vector information and reduce the encoding amount of the motion vector information. Accordingly, it is possible to improve the coding efficiency.

(2) Detailed Configuration of Tile Partitioning Section

Figure 8:
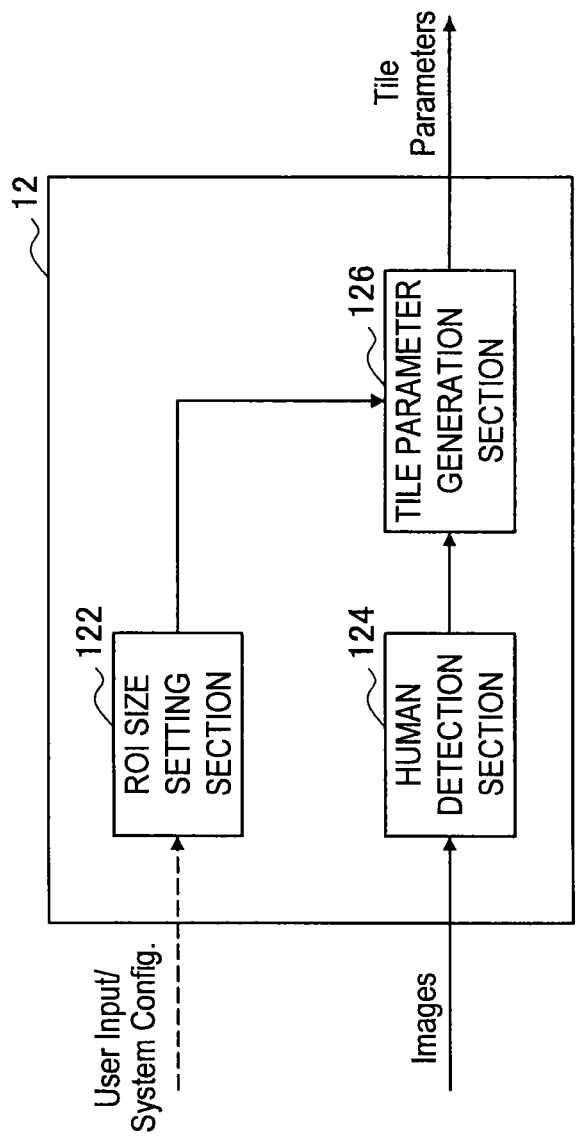
FIG. 8 is a block diagram showing an example of the detailed configuration of a tile partitioning section.

FIG. 8 is a block diagram showing an example of the detailed configuration of the tile partitioning section 12. Referring to FIG. 8, the tile partitioning section 12 includes an ROI size setting section 122, a human detection section 124, and a tile parameter generation section 126.

The ROI size setting section 122 sets a tile size of the ROI tile, for example, based on system setting input by a user or stored in advance. The human detection section 124 performs human detection by applying a human detection method of the related art to the encoding target image. The human detection section 124 sets the ROI (Region of Interest) including the detected human region in the encoding target image. The tile parameter generation section 126 decides the tile partitioning according to the position of the ROI set by the human detection section 124 and generates the tile parameters specifying the decided tile partitioning and the ROI tile. Then, the tile parameter generation section 126 outputs the generated tile parameters to the lossless encoding section 16, the intra prediction section 30, the inter prediction section 35, and the prediction control section 40.

Table 1 shows an example of the tile parameters which can be generated by the tile parameter generation section 126. The first column of Table 1 shows Parameter Names. The second column shows a Location into which each parameter can be inserted. In a third column, a parameter indicating "Yes" is a parameter that is newly defined in the technology in the present disclosure.

TABLE 1

TILE PARAMETERS

| Parameter Name | Location | New |
|---|---|---|
| num_tile_columns_minus1 | SPS, PPS | |
| num_tile_rows_minus1 | SPS, PPS | |
| uniform_spacing_flag | SPS, PPS | |
| column_width[i] | SPS, PPS | |
| row_height[i] | SPS, PPS | |
| roi_tile_present_flag | SPS, PPS (SEI) | Yes |
| coord_roi_tile_hor_minus1 | SPS, PPS (SEI) | Yes |
| coord_roi_tile_ver_minus1 | SPS, PPS (SEI) | Yes |
| roi_tile_indicator[i] | Slice Header | Yes |

The parameter "num_tile_columns_minus1" indicates the number of tile columns. When this parameter is zero, the number of tile columns is 1. The parameter "num_tile_rows_minus1" indicates the number of tile rows. When this parameter is zero, the number of tile rows is 1. The parameter "uniform_spacing_flag" is a flag indicating whether tile sizes in an image are uniform. The parameter "column_width[i]" indicates the width of an i-th tile column. The parameter "row_height[i]" indicates the height of an i-th tile row. These parameters were also described in Non-Patent Literature 2.

The parameters "roi_tile_present_flag," "coord_roi_tile_hor_minus1," "coord_roi_tile_ver_minus1," and "roi_tile_indicator[i]" are newly defined parameters. The parameter "roi_tile_present_flag" is a flag indicating whether an ROI tile is included in the encoding target image. When a plurality of ROI tiles can be set in one image, a parameter indicating the number of set ROI tiles may be generated instead of this flag. The parameters "coord_roi_tile_hor_minus1" and "coord_roi_tile_ver_minus1" indicate the position of an ROI tile (at which row and which column an ROI tile is located). For example, when both of the parameters are zero, the tile located at the first row and the first column is an ROI tile. When the parameter "roi_tile_present_flag" indicates False (that there is no ROI tile), the parameters "coord_roi_tile_hor_minus1" and "coord_roi_tile_ver_minus1" can be omitted. The parameters "roi_tile_present_flag," "coord_roi_tile_hor_minus1," and "coord_roi_tile_ver_minus1" may be inserted into an SPS or a PPS. Instead, these parameters may be inserted into SEI (Supplemental Enhancement Information). The "roi_tile_indicator[i]" is a parameter which can be inserted into a slice header. This parameter is a flag indicating whether an i-th tile in each slice is an ROI tile.

The tile parameters described herein are merely examples. Some of the above-described parameters may be omitted or additional parameters may be generated. Different names or kinds of other parameters may be generated instead of the above-described parameters. When the tile parameters are changed frequency for each picture, the tile parameters may be stored in an APS (Adaptation Parameter Set) rather than an SPS or a PPS.

[2-2. Example of Configuration of Stream]

Figure 9:
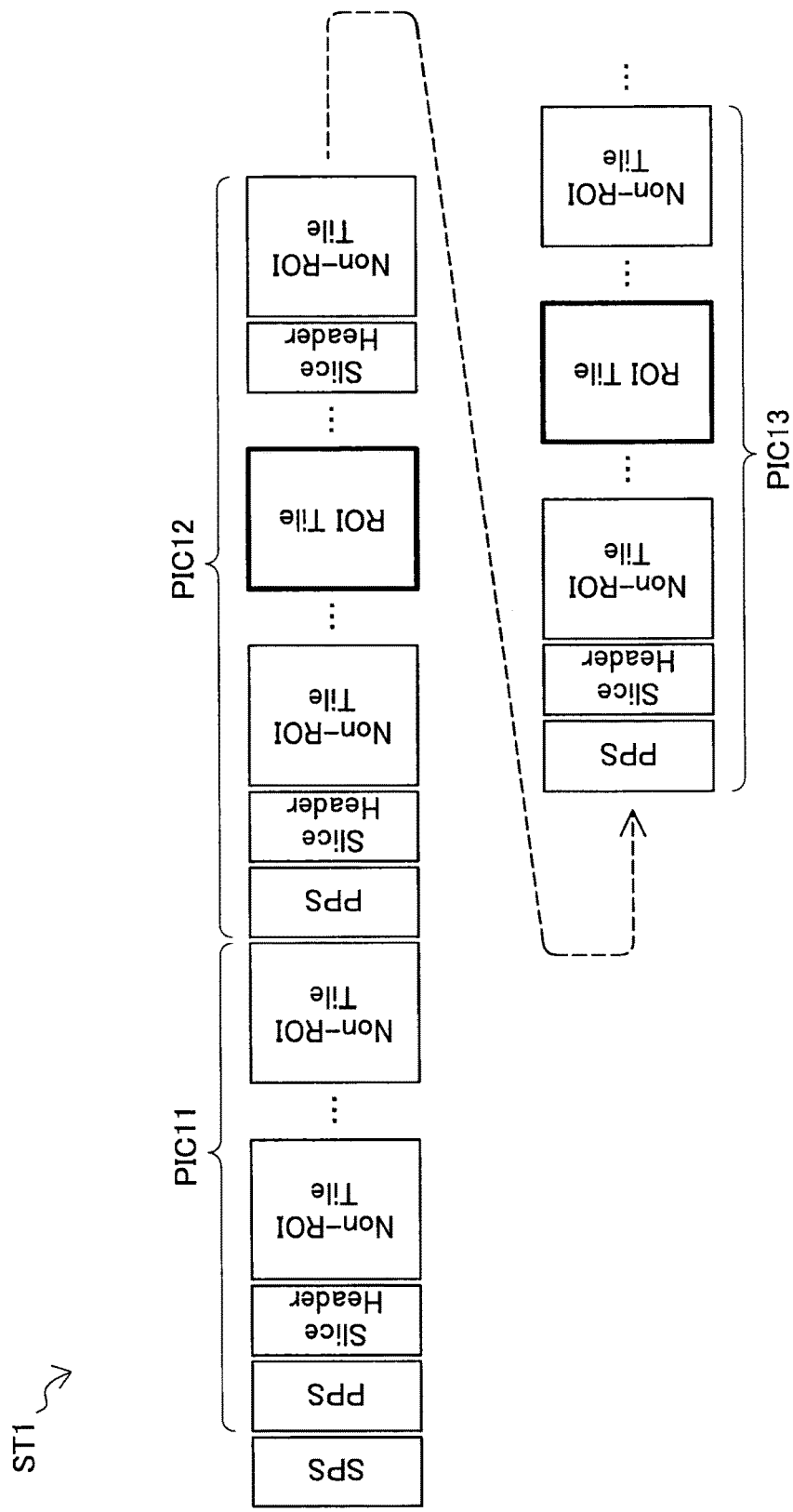
FIG. 9 is an explanatory diagram illustrating an example of the configuration of an encoded stream which can be generated in the first embodiment.

FIG. 9 is an explanatory diagram illustrating an example of the configuration of an encoded stream which can be generated in the embodiment. Referring to FIG. 9, an encoded stream ST1 is illustrated as an example. The encoded stream ST1 includes the image data of a plurality of pictures PIC11, PIC12, PIC13, etc. The picture PIC11 is a picture that includes no ROI tile. A PPS related to the picture PIC11 can include a flag (for example, "roi_tile_present_flag"=FALSE) indicating that no ROI tile is included. The pictures PIC12 and PIC13 are pictures that include an ROI tile. PPSs related to the pictures can include a flag (for example, "roi_tile_present_flag"=TRUE) indicating that an ROI tile is included and parameters (for example, "coord_roi_tile_hor_minus1" and "coord_roi_tile_ver_minus1") indicating the position of the ROI tile.

As understood from FIG. 9, in the embodiment, the lossless encoding section 16 generates one encoded stream including both of the image data of the ROI tile and the image data of the non-ROI tile. When the encoded stream is subjected to partial decoding, the image data of the non-ROI tile is ignored and only the ROI tile can be decoded from the image data of the ROI tile.

[2-3. Process Flow at the Time of Encoding]

(1) Overall Flow

Figure 10:
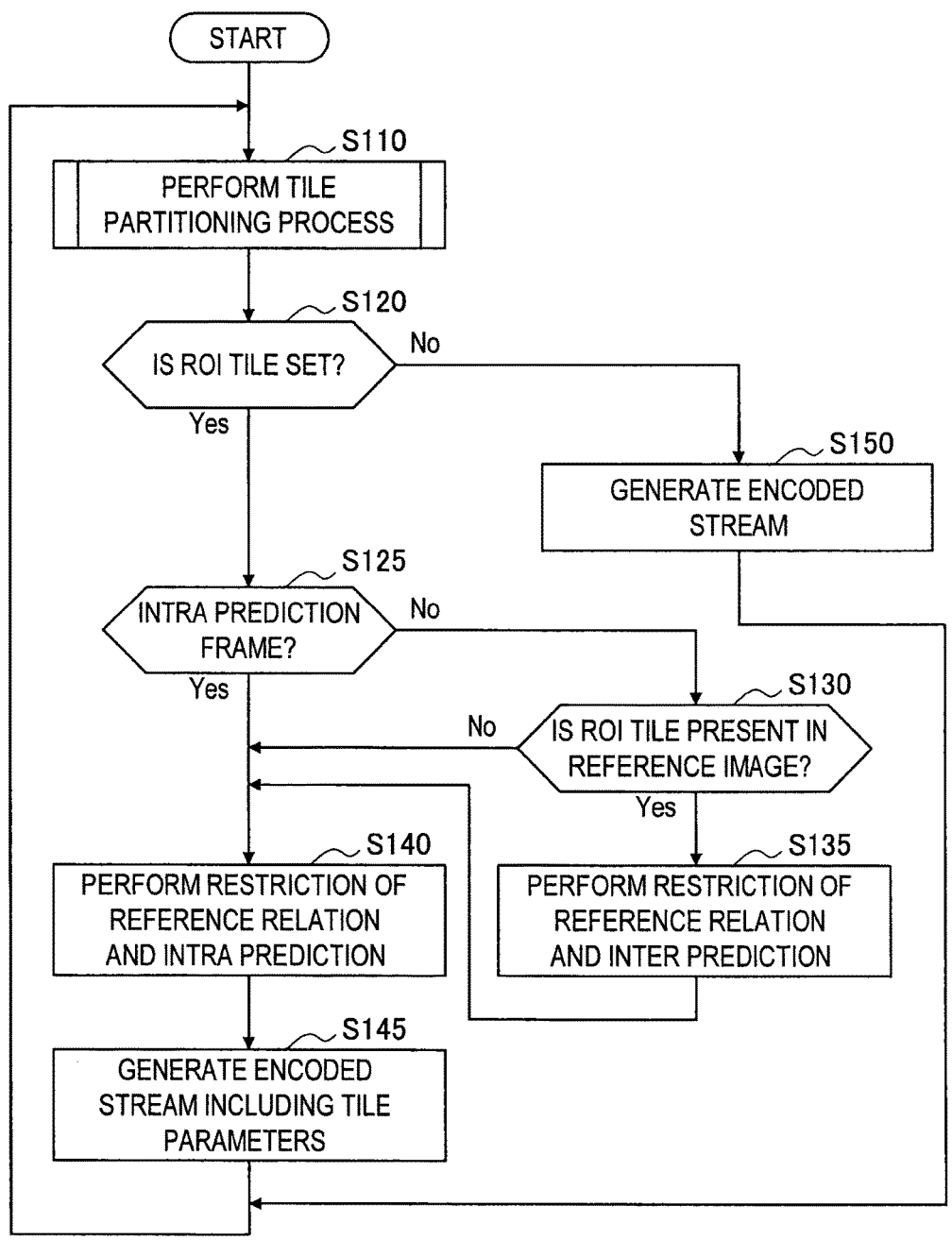
FIG. 10 is a flow chart showing an example of a process flow at the time of encoding according to the first embodiment.

FIG. 10 is a flow chart showing an example of a process flow at the time of encoding according to the embodiment. A process illustrated in FIG. 10 is repeated for each encoding target image. For the sake of brevity of description, portions which are not particularly different from the process according to the method of the related art are omitted from the drawing.

Referring to FIG. 10, the tile partitioning section 12 first performs the tile partitioning process (step S110). As the result of the tile partitioning process, the encoding target image can be partitioned into a plurality of tiles including an ROI tile. The detailed flow of the tile partitioning process will be further described below.

Next, the prediction control section 40 determines whether the ROI tile is set in the encoding target image (step S120). When the ROI tile is set in the encoding target image by the tile partitioning section 12, the process proceeds to step S125. Conversely, when the ROI tile is not set in the encoding target image, the process proceeds to step S150.

In step S125, the prediction control section 40 determines whether the encoding target image is an intra prediction frame (step S125). For example, when the encoding target image is one picture, the encoding target image is an intra prediction frame. In this case, the inter prediction is not performed and the process proceeds to step S140. Conversely, when the encoding target image is not the intra prediction frame, the process proceeds to step S130.

In step S130, the prediction control section 40 determines whether the ROI tile is included in the reference image (step S130). Here, when the ROI tile is included in the reference image, the process proceeds to step S135. When the ROI tile is not included in the reference image, the process proceeds to step S140.

In step S135, the inter prediction section 35 performs the inter prediction (step S135). When the inter prediction is performed in the PU in the ROI tile, the prediction control section 40 controls the inter prediction section 35 such that the non-ROI tile of the reference image is not referred to. On the other hand, when the inter prediction is performed in the PU in the non-ROI tile, the prediction control section 40 permits the inter prediction section 35 to refer to any tile of the reference image.

In step S140, the intra prediction section 30 performs the intra prediction (step S140). When the intra prediction is performed in each PU, the prediction control section 40 controls the intra prediction section 30 not to refer to tiles different from the tile to which the PU belongs.

Next, in step S145, the lossless encoding section 16 encodes the quantized data for each tile to generate an encoded stream. The lossless encoding section 16 inserts various parameters which can include the tile parameters, the information regarding the intra prediction, and the information regarding the inter prediction into the header region of the encoded stream (step S145).

In step S150, since the ROI tile is not set in the encoding target image, the image encoding device 1 generates an encoded stream as in the method of the related art (step S150). A tile parameter indicating that the encoding target image does not include the ROI tile is inserted into the header region of the encoded stream.

(2) Tile Partitioning Process

Figure 11:
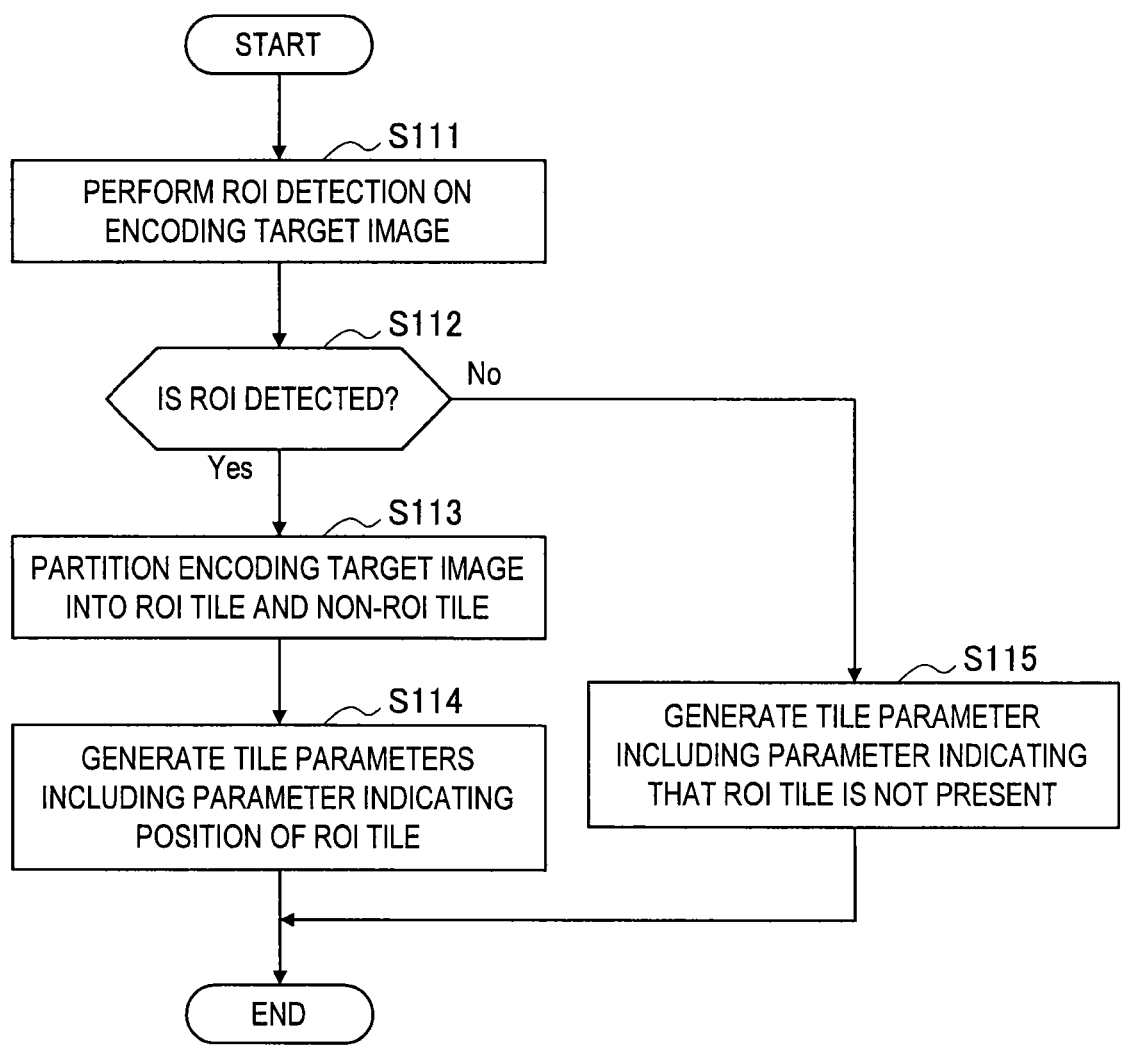
FIG. 11 is a flow chart showing an example of a detailed flow of a tile partitioning process.

FIG. 11 is a flow chart showing an example of a detailed flow of the tile partitioning process. Referring to FIG. 11, the tile partitioning section 12 first performs ROI detection (for example, human detection) on the encoding target image (step S111). Next, the tile partitioning section 12 determines whether the ROI is detected as the result of the ROI detection (step S112). When the ROI is detected, the tile partitioning section 12 partitions the encoding target image into a plurality of tiles including the ROI tile and the non-ROI tile (step S113). Then, the tile partitioning section 12 generates the tile parameters including the parameter indicating the position of the ROI tile (step S114). Conversely, when the ROI is not detected, the tile partitioning section 12 generates a tile parameter including a parameter indicating that the ROI tile is not present (that is, the encoding target image does not include the ROI tile) (step S115).

When a human region or other ROIs are not detected, the tile partitioning section 12 may set a tentative ROI tile in the encoding target image. For example, the tile partitioning section 12 can set the tentative ROI tile at a previously decided position (the middle or the like of the image) or the same position as the position of the finally set ROI tile. Accordingly, at least one ROI tile can be included in all of the images. As a result, in the decoder performing the partial decoding on only the ROI tile, a time at which the ROI tile is absent may be removed.

[2-4. Example of Configuration of Decoder]

Figure 12:
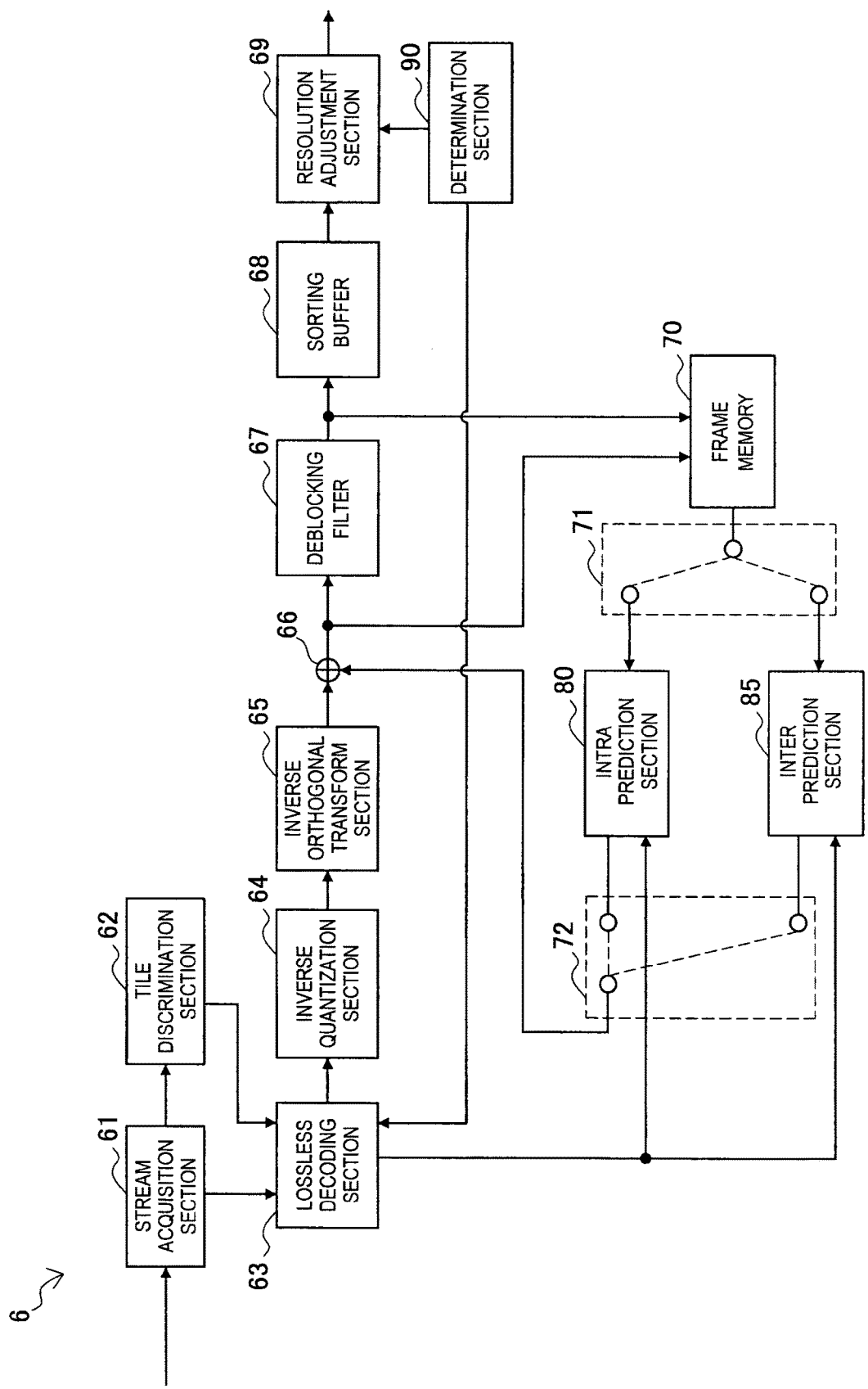
FIG. 12 is a block diagram showing an example of the configuration of an image decoding device according to the first embodiment.

FIG. 12 is a block diagram showing an example of the configuration of an image decoding device 6 according to the embodiment. Referring to FIG. 12, the image decoding device 6 includes a stream acquisition section 61, a tile discrimination section 62, a lossless decoding section 63, an inverse quantization section 64, an inverse orthogonal transform section 65, an addition section 66, a deblocking filter 67, a sorting buffer 68, a resolution adjustment section 69, a frame memory 70, and selectors 71 and 72, an intra prediction section 80, an inter prediction section 85, and a determination section 90.

The stream acquisition section 61 acquires the encoded stream input via a transmission path and buffers the encoded stream using a storage medium. The stream acquisition section 61 parses the encoded stream and acquires the tile parameters inserted into the header region. The tile parameters acquired herein can include a parameter indicating whether each decoding target image includes the ROI tile. When the decoding target image includes the ROI tile, the tile parameters also include a parameter indicating which tile is the ROI tile. The stream acquisition section 61 may acquire the tile parameters from the SPS, the PPS, or the slice header of the encoded stream. Instead, the stream acquisition section 61 may acquire the tile parameters from the SEI of the encoded stream.

The tile discrimination section 62 acquires the above-described tile parameters from the stream acquisition section 61. The tile discrimination section 62 discriminates the tile partitioning of each decoding target image and the position of the ROI tile based on the acquired tile parameters. For example, based on the parameters "num_tile_columns_minus1," "num_tile_rows_minus1," "uniform_spacing_flag," "column_width[i]," and "row_height[i]" exemplified in Table 1, the tile partitioning can be recognized as in the method of the related art. The newly defined parameter "roi_tile_present_flag" indicates whether the ROI tile is present. Based on the newly defined parameters "coord_roi_tile_hor_minus1," "coord_roi_tile_ver_minus1," and "roi_tile_indicator[i]," the position of the ROI tile can be recognized.

The lossless decoding section 63 decodes the encoded stream buffered by the stream acquisition section 61. More specifically, the lossless decoding section 63 decodes the image data of the ROI tile discriminated based on the above-described tile parameters. When the determination section 90 gives an instruction to perform entire decoding, the lossless decoding section 63 also decodes the image data of the non-ROI tile. When the determination section 90 gives an instruction to perform the partial decoding, the lossless decoding section 63 does not decode the image data of the non-ROI tile. The lossless decoding section 63 outputs the decoded image data (quantized data) to the inverse quantization section 64. The lossless decoding section 63 outputs the information regarding the intra prediction to the intra prediction section 80. The lossless decoding section 63 outputs the information regarding the inter prediction to the inter prediction section 85.

The inverse quantization section 64 performs inverse quantization on the quantized data after the decoding performed by the lossless decoding section 63. The inverse orthogonal transform section 65 performs an inverse orthogonal transform on the transform coefficient data input from the inverse quantization section 64 according to an orthogonal transform scheme used at the time of the encoding to generate predicted error data. Then, the inverse orthogonal transform section 65 outputs the generated predicted error data to the addition section 66.

The addition section 66 adds the predicted error data input from the inverse orthogonal transform section 65 and the predicted image data input from the selector 72 to generate decoded image data (reconstructed image data). Then, the addition section 66 outputs the generated decoded image data to the deblocking filter 67 and the frame memory 70.

The deblocking filter 67 performs a filtering process to remove block distortion occurring in the decoded image. Then, the deblocking filter 67 outputs the filtered decoded image data from which the block distortion is removed to the sorting buffer 68 and the frame memory 70.

The sorting buffer 68 sorts the images input in the decoding order from the deblocking filter 67 in a presentation order. Then, the sorting buffer 68 outputs the series of decoded image data after the sorting to the resolution adjustment section 69.

The resolution adjustment section 69 adjusts the resolution of each of the decoded images input from the sorting buffer 68. For example, the resolution adjustment section 69 may generate the display image by increasing the resolution of the decoded image of the ROI tile generated through the partial decoding according to the resolution of a display. Instead, the resolution adjustment section 69 may generate the display image by decreasing the resolution of the decoded images (including the ROI tile and the non-ROI tile) generated through the entire decoding. The resolution adjustment section 69 outputs the decoded image data of which the resolutions are adjusted, for example, to a display (not illustrated) connected to the image decoding device 6.

The frame memory 70 stores the decoded image data before the filtering input from the addition section 66 and the decoded image data after the filtering input from the deblocking filter 6 using a storage medium.

The selector 71 switches an output destination of the data from the frame memory 70 between the intra prediction section 80 and the inter prediction section 85 according to the mode information decoded by the lossless decoding section 63. For example, when the intra prediction mode is designated, the selector 71 outputs the decoded image data before the filtering supplied from the frame memory 70 as reference image data to the intra prediction section 80. When the inter prediction mode is designated, the selector 71 outputs the decoded image data after the filtering supplied from the frame memory 70 as reference image data to the inter prediction section 85.

The selector 72 switches an output source of the predicted image data to be supplied to the addition section 66 between the intra prediction section 80 and the inter prediction section 85 according to the mode information decoded by the lossless decoding section 63. For example, when the intra prediction mode is designated, the selector 72 supplies the predicted image data output from the intra prediction section 80 to the addition section 66. When the inter prediction mode is designated, the selector 72 supplies the predicted image data output from the inter prediction section 85 to the addition section 66.

The intra prediction section 80 performs the intra prediction based on the information regarding the intra prediction input from the lossless decoding section 63 and the reference image data from the frame memory 70 to generate the predicted image data. Then, the intra prediction section 80 outputs the generated predicted image data to the selector 72.

The inter prediction section 85 performs the inter prediction based on the information regarding the inter prediction input from the lossless decoding section 63 and the reference image data from the frame memory 70 to generate the predicted image data. Then, the inter prediction section 85 outputs the generated predicted image data to the selector 72. The information regarding the inter prediction normally includes the prediction mode information, the motion vector information, and the reference image information.

When the motion vector information acquired in the PU in the ROI tile of the decoding target image is offset depending on the position of the ROI tile on the side of the encoder, the inter prediction section 85 can cancel the offset of the motion vector information according to a difference between the positions of the ROI tiles of the reference image and the decoding target image. Then, the inter prediction section 85 can perform the inter prediction using the motion vector information of which the offset is cancelled.

The determination section 90 determines whether the image decoding device 6 performs one of the partial decoding and the entire decoding. For example, when the performance of a processor, a memory, or a display is not sufficient to decode the entire decoding target image, the determination section 90 may determine that the partial decoding is performed. When the bandwidth of a communication channel with a device transmitting the encoded stream is narrow, the determination section 90 may determine that the partial decoding is performed. In this case, the determination section 90 may give a request for transmitting only the image data of the ROI tile to the device transmitting the encoded stream. When the partial decoding is designated by a user (for example, since the user may not necessarily browse the image of the non-ROI tile), the determination section 90 may determine that the partial decoding is performed.

When the determination section 90 determines that the partial decoding is performed, the determination section 90 instructs the lossless decoding section 63 to perform the partial decoding. Conversely, when the determination section 90 determines that the entire decoding is performed, the determination section 90 instructs the lossless decoding section 63 to perform the entire decoding. When the lossless decoding section 63 receives the instruction to perform the partial decoding, the lossless decoding section 63 decodes only the ROI tile of the decoding target image. Conversely, when the lossless decoding section 63 receives the instruction to perform the entire decoding, the lossless decoding section 63 decodes the non-ROI tile in addition to the ROI tile. When the resolution adjustment section 69 receives the instruction of the partial decoding from the determination section 90, the resolution adjustment section 69 adjusts the resolution of the image of the ROI tile based on the size of the ROI tile and the size of the display. Conversely, when the resolution adjustment section 69 receives the instruction of the entire decoding from the determination section 90, the resolution adjustment section 69 adjusts the resolution of the decoded image based on the entire size of the decoded image and the size of the display.

[2-5. Process Flow at the Time of Decoding]

Figure 13:
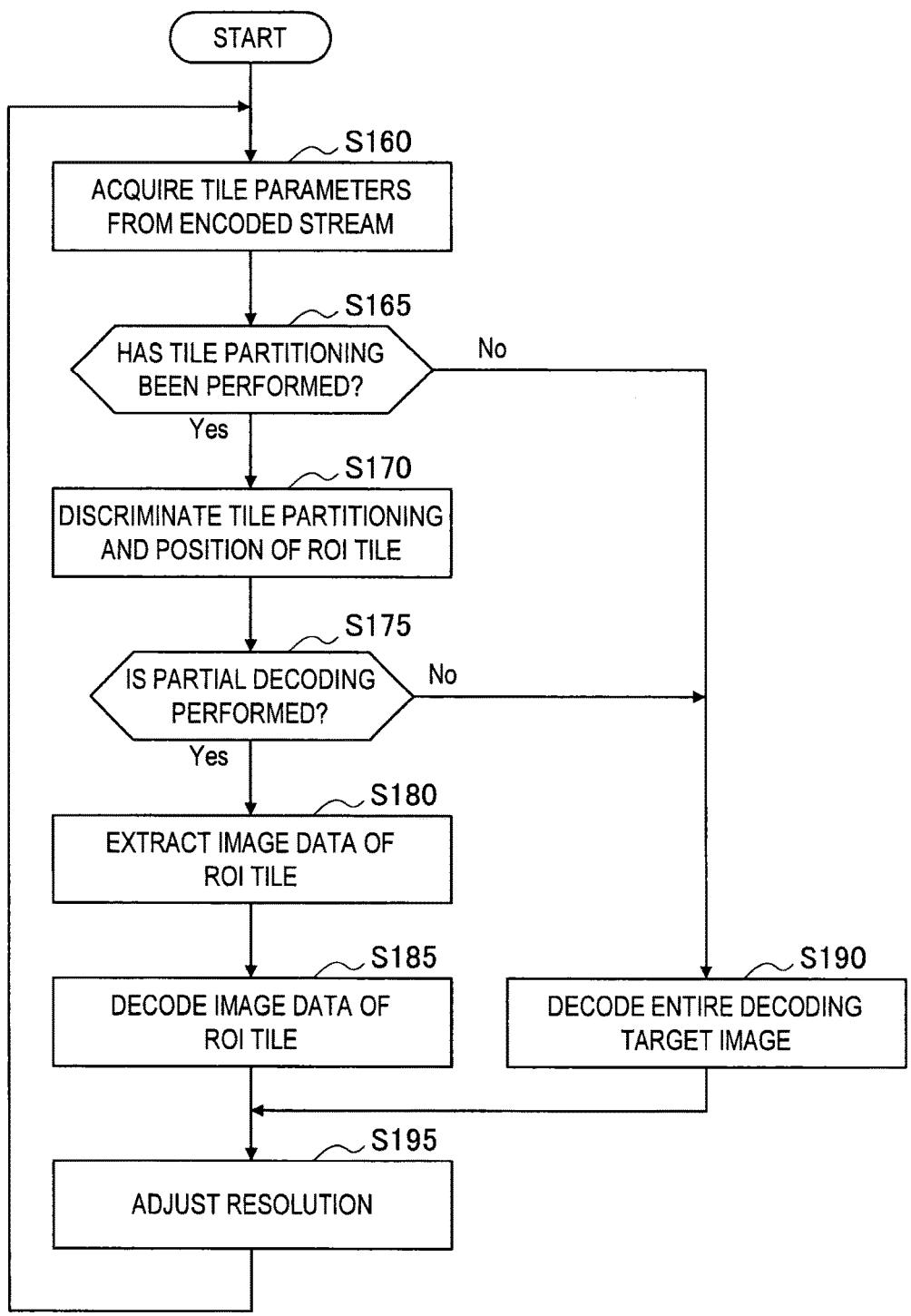
FIG. 13 is a flow chart showing an example of a process flow at the time of decoding according to the first embodiment.

FIG. 13 is a flow chart showing an example of a process flow at the time of the decoding according to the embodiment. The process illustrated in FIG. 13 is repeated on each decoding target image. For the sake of brevity of description, portions which are not particularly different from the process according to the method of the related art are omitted from the drawing.

Referring to FIG. 13, the stream acquisition section 61 first acquires the tile parameters from the encoded stream (step S160). Next, the tile discrimination section 62 determines whether the decoding target image is subjected to the tile partitioning (step S165). When the decoding target image is subjected to the tile partitioning, the process proceeds to step S170. Conversely, when the decoding target image is not subjected to the tile partitioning, the process proceeds to step S190.

In step S170, the tile discrimination section 62 discriminates the tile partitioning of the decoding target image and the position of the ROI tile based on the tile parameters (step S170).

Next, the determination section 90 determines whether the partial decoding is performed (step S175). Here, when it is determined that the partial decoding is performed, the process proceeds to step S180. Conversely, when it is determined that the partial decoding is not performed, the process proceeds to step S195.

In step S180, the lossless decoding section 63 extracts only the image data of the ROI tile among all of the tiles from the buffered encoded stream (step S180) and decodes the extracted image data of the ROI tile (step S185).

On the other hand, in step S190, the lossless decoding section 63 decodes the image data of the ROI tile and the non-ROI tile of the buffered encoded stream (step S190).

Thereafter, the resolution adjustment section 69 adjusts the resolution of the decoded image input from the sorting buffer 68 according to the resolution of the display (step S195). Then, the image of which the resolution is adjusted is displayed on the display.

<3. Second Embodiment>

In a second embodiment, so-called scalable coding is realized. SVC (Scalable Video Coding) refers to a technology in which a layer transmitting a rough image signal and a layer transmitting a fine image signal are hierarchically encoded. Various kinds of scalable encoding are present. For example, a case in which spatial resolutions are hierarchized is referred to as space scalability, a case in which frame rates are hierarchized is referred to as time scalability, and a case in which SN (Signal-to-Noise) ratios are hierarchized is referred to as SNR scalability.

The scalable coding realized in the technology in the present disclosure can be expressed as regional scalability unlike scalability of the related art described above. In the regional scalability, an encoded stream of a base layer includes image data of only an ROI tile. In an encoded stream of an enhancement layer, image data of the ROI tile is omitted. The encoded stream of the enhancement layer includes image data of only a non-ROI tile. A decoder performing the partial decoding decodes the encoded stream of the base layer to generate the decoded image data including only the ROI tile.

[3-1. Example of Configuration of Encoder]

(1) Overall Configuration

Figure 14:
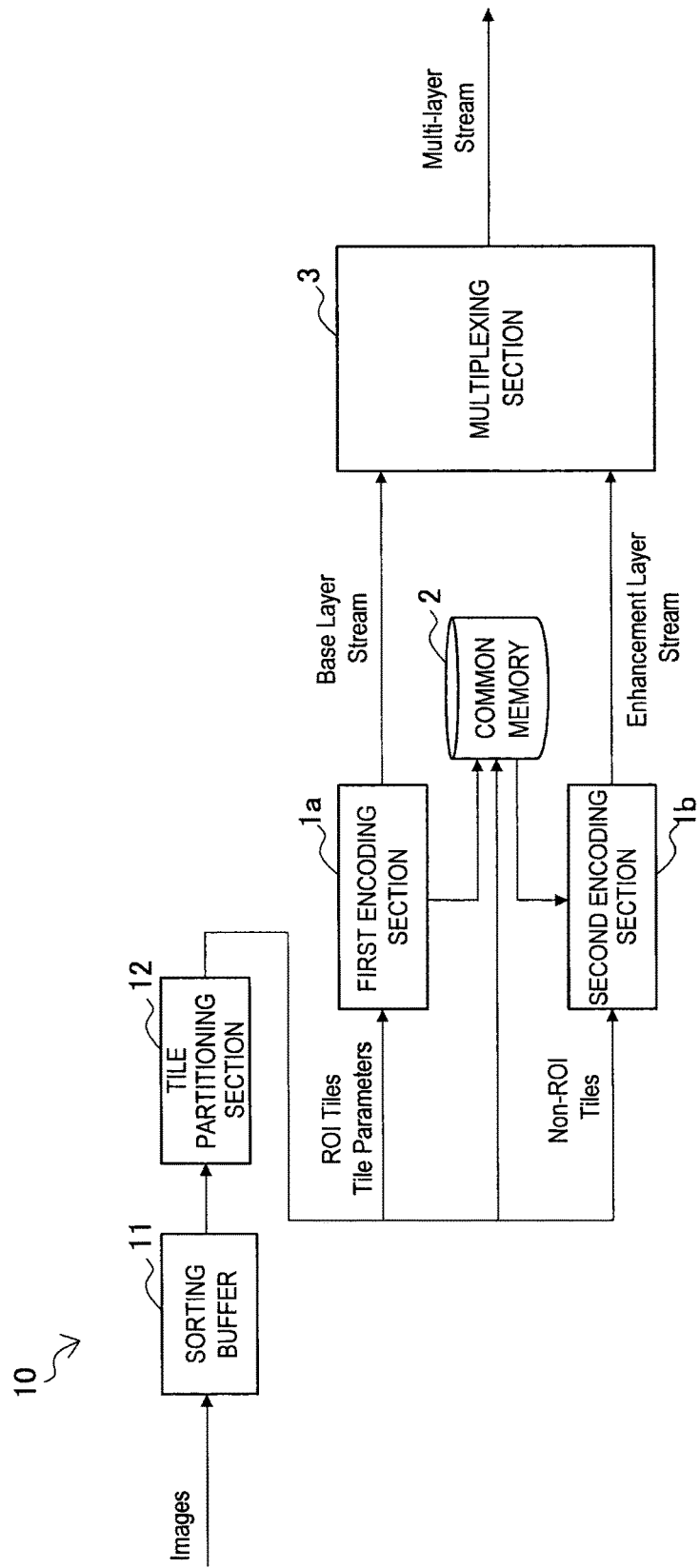
FIG. 14 is a block diagram showing an example of an overall configuration of an image encoding device according to a second embodiment.

FIG. 14 is a block diagram showing an example of an overall configuration of an image encoding device 10 according to the embodiment. Referring to FIG. 14, the image encoding device 10 includes a sorting buffer 11, a tile partitioning section 12, a first encoding section 1a, a second encoding section 1b, a common memory 2, and a multiplexing section 3.

The sorting buffer 11 sorts the encoding target images included in the series of original image data in the encoding/decoding order according to a GOP structure. The tile partitioning section 12 partitions the encoding target image into a plurality of tiles including an ROI tile. The tile partitioning section 12 generates tile parameters indicating how each image is partitioned and indicating which tile is the ROI tile. The tile partitioning section 12 outputs a partial image (hereinafter referred to as an ROI tile image) corresponding to the ROI tile in the encoding target image and the tile parameters to the first encoding section 1a. The tile partitioning section 12 outputs a partial image (hereinafter referred to as a non-ROI tile image) corresponding to a non-ROI tile to the second encoding section 1b. The tile parameters can be stored by the common memory 2.

The first encoding section 1a encodes the ROI tile image to generate an encoded stream of the base layer. The second encoding section 1b encodes the non-ROI tile image to generate an encoded stream of the enhancement layer. The common memory 2 stores information commonly used between the layers. The multiplexing section 3 multiplexes the encoded stream of the base layer generated by the first encoding section 1a and the encoded stream of the enhancement layer generated by the second encoding section 1b to generate a multiplexed multilayer stream.

(2) Encoding of Base Layer

Figure 15:
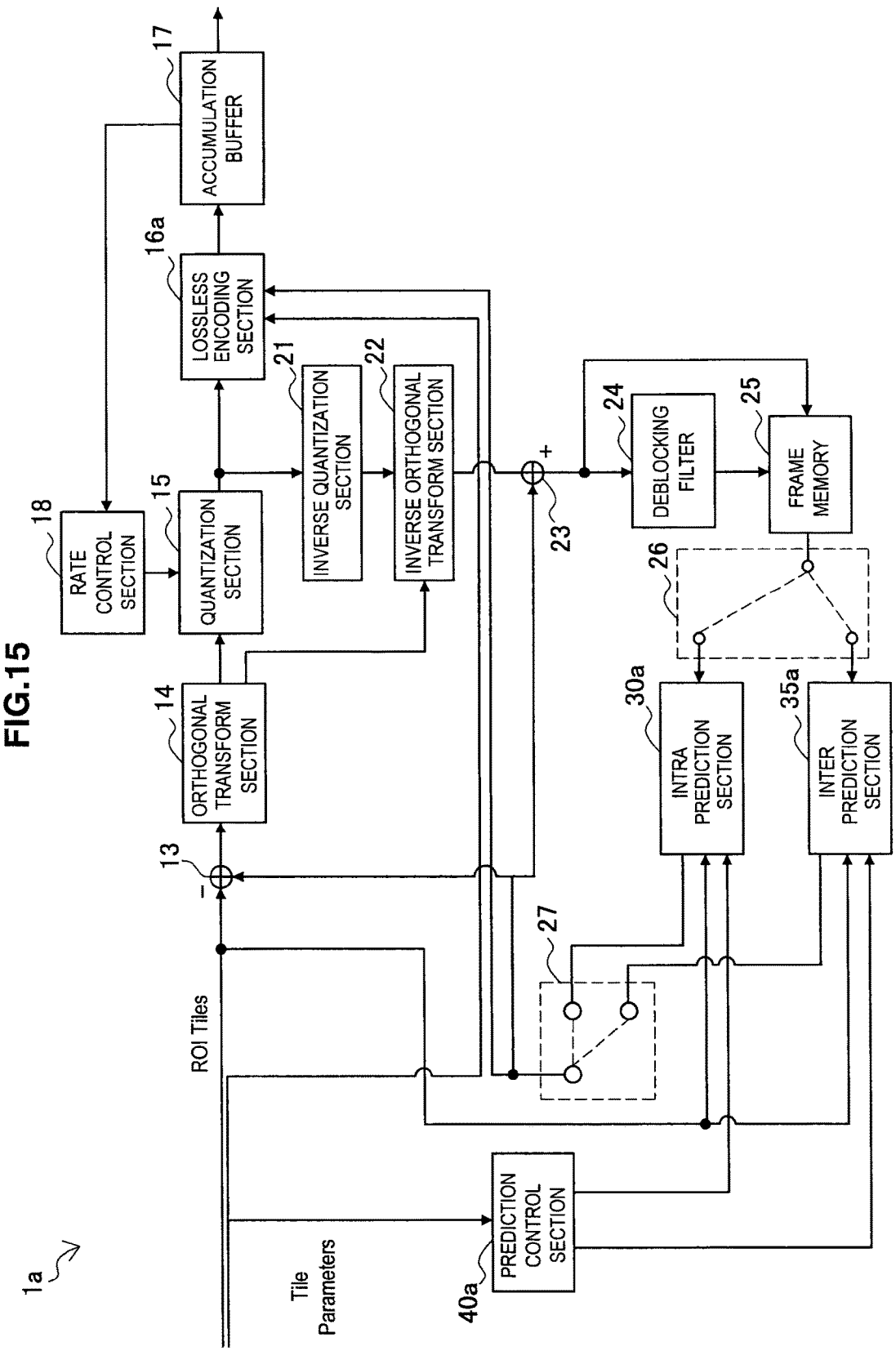
FIG. 15 is a block diagram showing an example of the configuration of a first encoding section illustrated in FIG. 14.

FIG. 15 is a block diagram showing an example of the configuration of the first encoding section 1a illustrated in FIG. 14. Referring to FIG. 15, the first encoding section 1a includes a subtraction section 13, an orthogonal transform section 14, a quantization section 15, a lossless encoding section 16a, an accumulation buffer 17, a rate control section 18, an inverse quantization section 21, an inverse orthogonal transform section 22, an addition section 23, a deblocking filter 24, a frame memory 25, selectors 26 and 27, an intra prediction section 30a, an inter prediction section 35a, and a prediction control section 40a.

The subtraction section 13 is supplied with the predicted image data and the original image data of the ROI tile image input from the tile partitioning section 12 illustrated in FIG. 14. The subtraction section 13 calculates predicted error data which is a difference between the original image data and the predicted image data. The orthogonal transform section 14 performs an orthogonal transform on the predicted error data input from the subtraction section 13. The quantization section 15 quantizes the transform coefficient data input from the orthogonal transform section 14 to generate quantized data.

The lossless encoding section 16a performs a lossless encoding process on the quantized data of the ROI tile to generate the encoded stream of the base layer. The lossless encoding section 16a inserts various parameters including the tile parameters into the header region of the encoded stream of the base layer. The accumulation buffer 17 temporarily accumulates the encoded stream of the base layer generated by the lossless encoding section 16a and outputs the accumulated encoded stream to the multiplexing section 3 illustrated in FIG. 14.

The rate control section 18 controls a bit rate of the quantized data by monitoring a free space of the accumulation buffer 17. The inverse quantization section 21 performs an inverse quantization process on the quantized data input from the quantization section 15. The inverse orthogonal transform section 22 performs an inverse orthogonal transform process on the transform coefficient data input from the inverse quantization section 21 to restore the predicted error data. The addition section 23 generates the decoded image data by adding the predicted error data input from the inverse orthogonal transform section 22 and the predicted image data input from the selector 27 to generate decoded image data. The deblocking filter 24 performs a filtering process to reduce block distortion occurring at the time of the encoding of the image. The frame memory 25 stores the decoded image data before the filtering and the decoded image data after the filtering.

The intra prediction section 30a performs an intra prediction process on the ROI tile image based on the original image data of the ROI tile image input from the tile partitioning section 12 and the decoded image data supplied via the selector 26. The inter prediction section 35a performs an inter prediction process on the ROI tile image based on the original image data of the ROI tile image input from the tile partitioning section 12 and the decoded image data supplied via the selector 26.

The prediction control section 40a controls the restrictions of the reference relation imposed on the intra prediction and the inter prediction. For example, when the intra prediction is performed in each PU in the ROI tile, the prediction control section 40a controls the intra prediction section 30a such that the other tiles are not referred to. When the reference image does not include the ROI tile, the prediction control section 40a causes the inter prediction section 35a not to perform the inter prediction. For example, when the inter prediction is performed in each PU in the ROI tile, the prediction control section 40a controls the inter prediction section 35a so that only the ROI tile of the reference image is referred to.

(3) Encoding of Enhancement Layer

Figure 16:
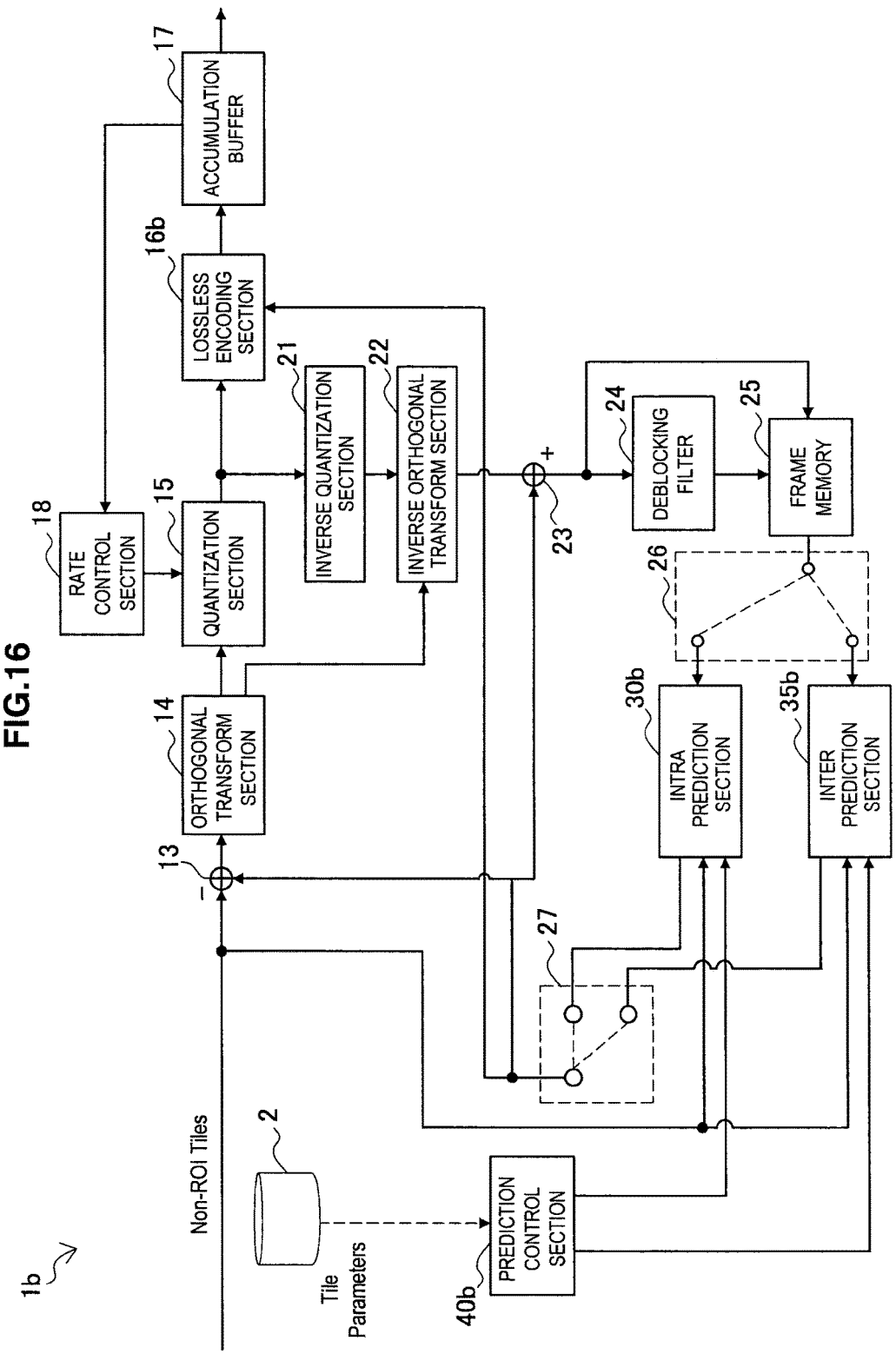
FIG. 16 is a block diagram showing an example of the configuration of a second encoding section illustrated in FIG. 14.

FIG. 16 is a block diagram showing an example of the configuration of the second encoding section 1b illustrated in FIG. 14. Referring to FIG. 16, the second encoding section 1b includes a subtraction section 13, an orthogonal transform section 14, a quantization section 15, a lossless encoding section 16b, an accumulation buffer 17, a rate control section 18, an inverse quantization section 21, an inverse orthogonal transform section 22, an addition section 23, a deblocking filter 24, a frame memory 25, selectors 26 and 27, an intra prediction section 30b, an inter prediction section 35b, and a prediction control section 40b.

The subtraction section 13 is supplied with the prediction image data and the original image data of the non-ROI tile image input from the tile partitioning section 12 illustrated in FIG. 14. The subtraction section 13 calculates predicted error data which is a difference between the original image data and the predicted image data. The orthogonal transform section 14 performs the orthogonal transform on the predicted error data input from the subtraction section 13. The quantization section 15 quantizes the transform coefficient data input from the orthogonal transform section 14 to generate quantized data.

The lossless encoding section 16b performs a lossless encoding process on the quantized data of the non-ROI tile to generate an encoded stream of the enhancement layer. Since the tile parameters can be reused between the layers, the lossless encoding section 16b may not insert the tile parameters into the header region of the encoded stream of the enhancement layer. The accumulation buffer 17 temporarily accumulates the encoded stream of the enhancement layer generated by the lossless encoding section 16b and outputs the accumulated encoded stream to the multiplexing section 3 illustrated in FIG. 14.

The rate control section 18 controls a bit rate of the quantized data by monitoring a free space of the accumulation buffer 17. The inverse quantization section 21 performs an inverse quantization process on the quantized data input from the quantization section 15. The inverse orthogonal transform section 22 performs an inverse orthogonal transform process on the transform coefficient data input from the inverse quantization section 21 to restore the predicted error data. The addition section 23 generates the decoded image data by adding the predicted error data input from the inverse orthogonal transform section 22 and the predicted image data input from the selector 27 to generate decoded image data. The deblocking filter 24 performs a filtering process to reduce block distortion occurring at the time of the encoding of the image. The frame memory 25 stores all of the decoded image data (before the filtering and after the filtering) including both of the ROI tile and the non-ROI tile at the time of the encoding of the enhancement layer.

The intra prediction section 30b performs an intra prediction process on the non-ROI tile image based on the original image data of the non-ROI tile image input from the tile partitioning section 12 and the decoded image data supplied via the selector 26. The inter prediction section 35b performs an inter prediction process on the non-ROI tile image based on the original image data of the non-ROI tile image input from the tile partitioning section 12 and the decoded image data supplied via the selector 26.

When the intra prediction is performed in each PU in the non-ROI tile, the prediction control section 40b controls the intra prediction section 30b such that the other tiles are not referred to. When the inter prediction is performed in each PU in the non-ROI tile, the prediction control section 40b may cause the inter prediction section 35b to refer to any tile of the reference image irrespective of whether any tile of the reference image is the ROI tile.

[3-2. Example of Configuration of Stream]

Figure 17:
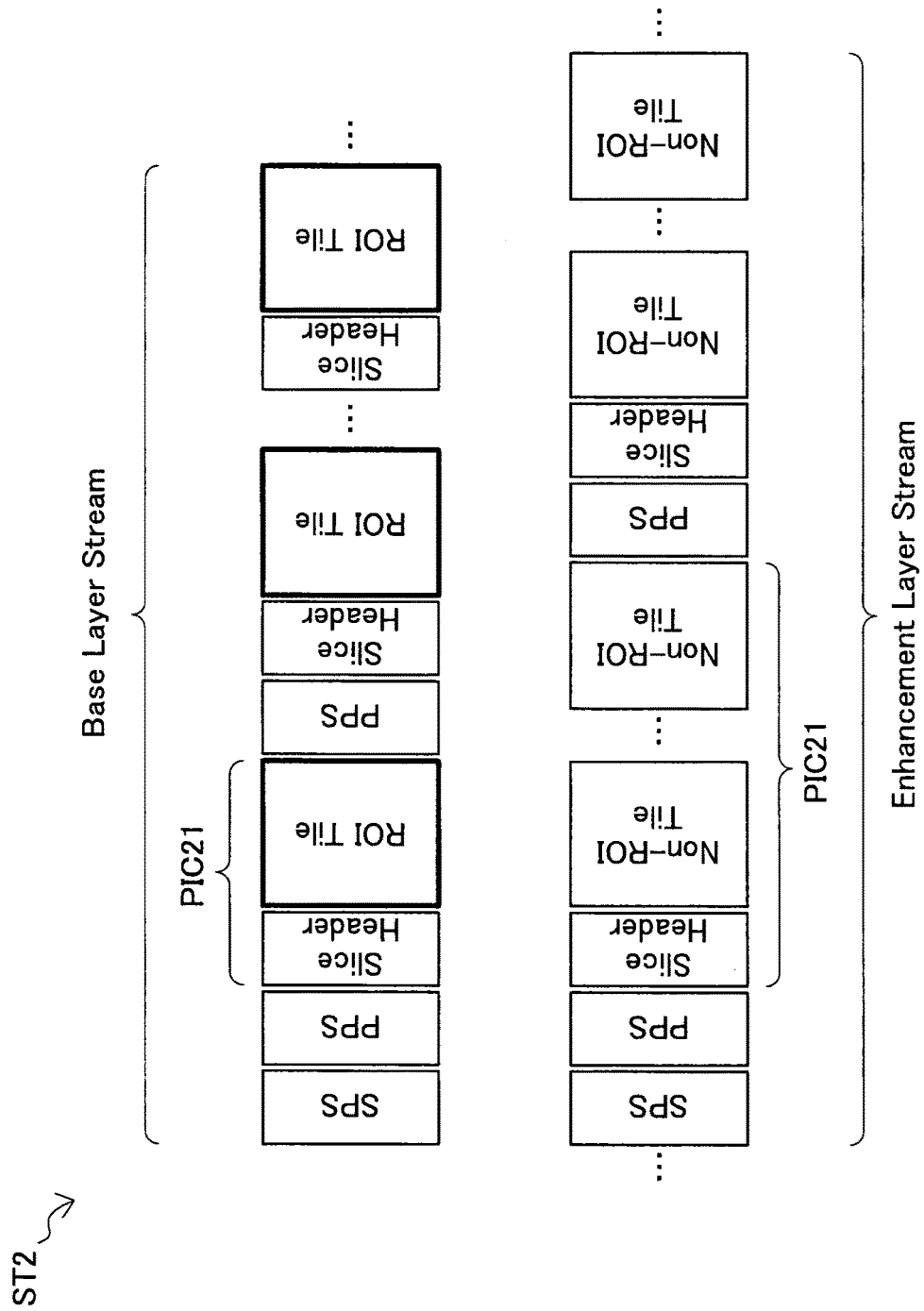
FIG. 17 is an explanatory diagram illustrating an example of the configuration of a multiplexed stream which can be generated in the second embodiment.

FIG. 17 is an explanatory diagram illustrating an example of the configuration of the multiplexed stream which can be generated in the embodiment. Referring to FIG. 17, a multiplexed stream ST2 is illustrated as an example. The multiplexed stream ST2 includes the encoded stream of the base layer and the encoded stream of the enhancement layer. The encoded stream of the base layer includes the image data of only the ROI tile in addition to header data such as the SPS, the PPS, and the slice header. On the other hand, the encoded stream of the enhancement layer includes the image data of only the non-ROI tile. For example, the image data of the ROI tile of a picture PIC21 is included in the encoded stream of the base layer and the image data of one or more non-ROI tiles of the picture PIC21 is included in the encoded stream of the enhancement layer. When the partial decoding is performed by the decoder, only the encoded stream of the base layer is decoded. When the entire decoding is performed by the decoder, both of the encoded stream of the base layer and the encoded stream of the enhancement layer are decoded, and the separately generated ROI tile image and non-ROI tile image are combined.

[3-3. Process Flow at the Time of Encoding]

Figure 18:
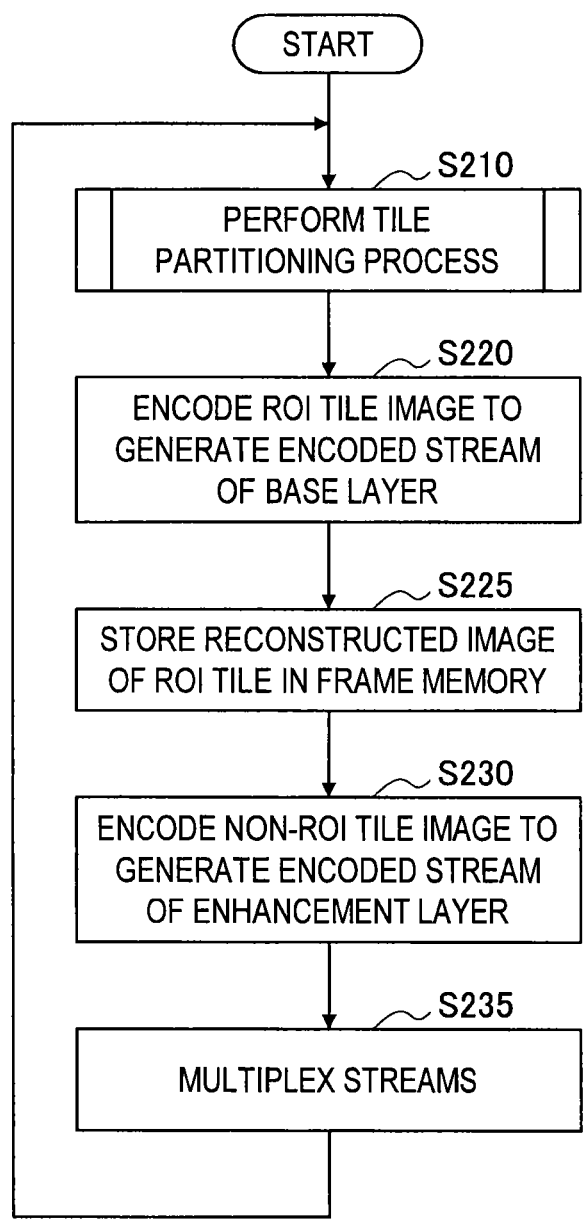
FIG. 18 is a flow chart showing an example of a process flow at the time of encoding according to the second embodiment.

FIG. 18 is a flow chart showing an example of a process flow at the time of the encoding according to the embodiment. The process illustrated in FIG. 18 is repeated on each encoding target image.

Referring to FIG. 18, the tile partitioning section 12 first performs the tile partitioning process described with reference to FIG. 11 (step S210). The encoding target image is partitioned into the ROI tile image and the non-ROI tile image as the result of the tile partitioning process. Here, for example, one ROI tile is assumed to be set in all of the encoding target images.

Next, the first encoding section 1a encodes the ROI tile image to generate the encoded stream of the base layer (step S220). The reconstructed image of the ROI tile is stored in the frame memory 25 (step S225).

Next, the second encoding section 1b encodes the non-ROI tile image to generate the encoded stream of the enhancement layer (step S230).

Next, the multiplexing section 3 multiplexes the encoded stream of the base layer generated by the first encoding section 1a and the encoded stream of the enhancement layer generated by the second encoding section 1b to generate the multiplexed multilayer stream (step S235).

As understood from the foregoing description, the first encoding section 1a may not necessarily recognize that the image encoded by the first encoding section 1a is the ROI tile image corresponding to a part of the original image. That is, the first encoding section 1a can handle the ROI tile image as the single encoding target image not subjected to the tile partitioning. This means that the first encoding section 1a can perform the encoding process of the base layer according to an image coding scheme other than the HEVC scheme. For example, the first encoding section 1a may generate the encoded stream of the base layer according to an image coding scheme such as an AVC (Advanced Video Coding) scheme or an MPEG2 scheme which does not support the tile partitioning. On the other hand, the second encoding section 1b recognizes the position of each tile according to the HEVC scheme which supports the tile partitioning and generates the encoded stream of the enhancement layer in which the image data of the ROI tile is omitted.

[3-4. Example of Configuration of Decoder]

(1) Overall Configuration

Figure 19:
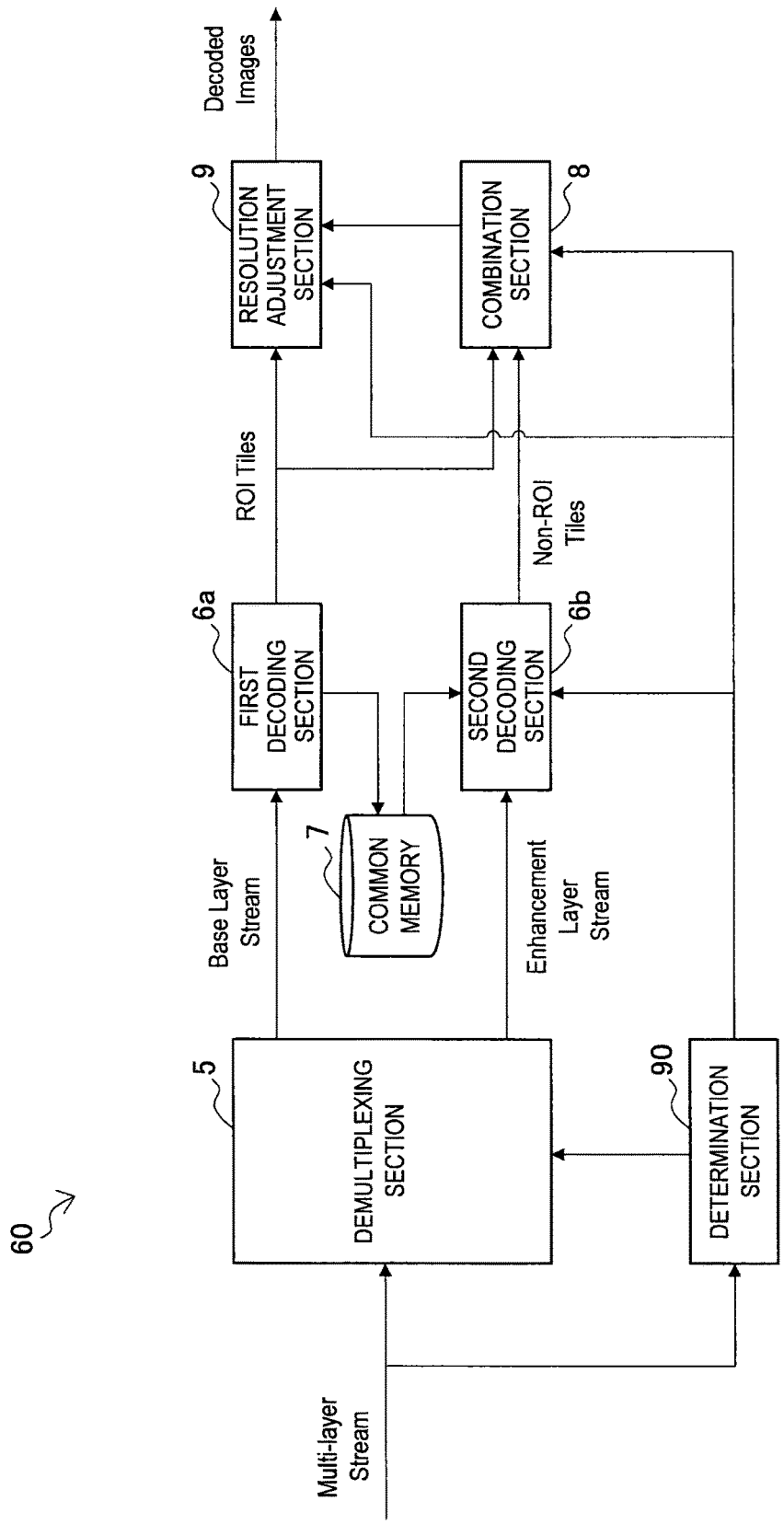
FIG. 19 is a block diagram showing an example of an overall configuration of an image decoding device according to the second embodiment.

FIG. 19 is a block diagram showing an example of an overall configuration of an image decoding device 60 according to the embodiment. Referring to FIG. 19, the image decoding device 60 includes a demultiplexing section 5, a first decoding section 6a, a second decoding section 6b, a common memory 7, a combination section 8, a resolution adjustment section 9, and a determination section 90.

The demultiplexing section 5 demulitplexes the multiplexed multilayer stream into the encoded stream of the base layer and the encoded stream of the enhancement layer. The first decoding section 6a decodes the ROI tile image from the encoded stream of the base layer. When an instruction of the entire decoding is given by the determination section 90, the second decoding section 6b decodes the non-ROI tile image from the encoded stream of the enhancement layer. The common memory 7 stores information commonly used between the layers.

When an instruction of the entire decoding is given by the determination section 90, the combination section 8 combines the ROI tile image generated by the first decoding section 6a and the non-ROI tile image generated by the second decoding section 6b to restore the entire original image.

The resolution adjustment section 9 adjusts the resolution of the decoded image of the ROI tile generated by the first decoding section 6a or the entire decoded image including both of the ROI tile and the non-ROI tile and generated by the combination section 8. The resolution adjustment section 9 outputs the decoded image data of which the resolution is adjusted, for example, to a display (not illustrated) connected to the image decoding device 60.

The determination section 90 determines whether the image decoding device 60 performs one of the partial decoding and the entire decoding according to, for example, performance or a kind of device, a communication bandwidth, or user designation. When the determination section 90 determines that the partial decoding is performed, the determination section 90 causes the first decoding section 6a to decode only the ROI tile image. Conversely, when the determination section 90 determines that the entire decoding is performed, the determination section 90 causes the second decoding section 6b to further decode the non-ROI tile image from the encoded stream of the enhancement layer and causes the combination section 8 to combine the ROI tile image and the non-ROI tile image.

The first decoding section 6a may decode the ROI image from the encoded stream of the base layer according to an image encoding scheme such as the AVC scheme or the MPEG2 scheme which does not support the tile partitioning.

(2) Decoding of Base Layer

Figure 20:
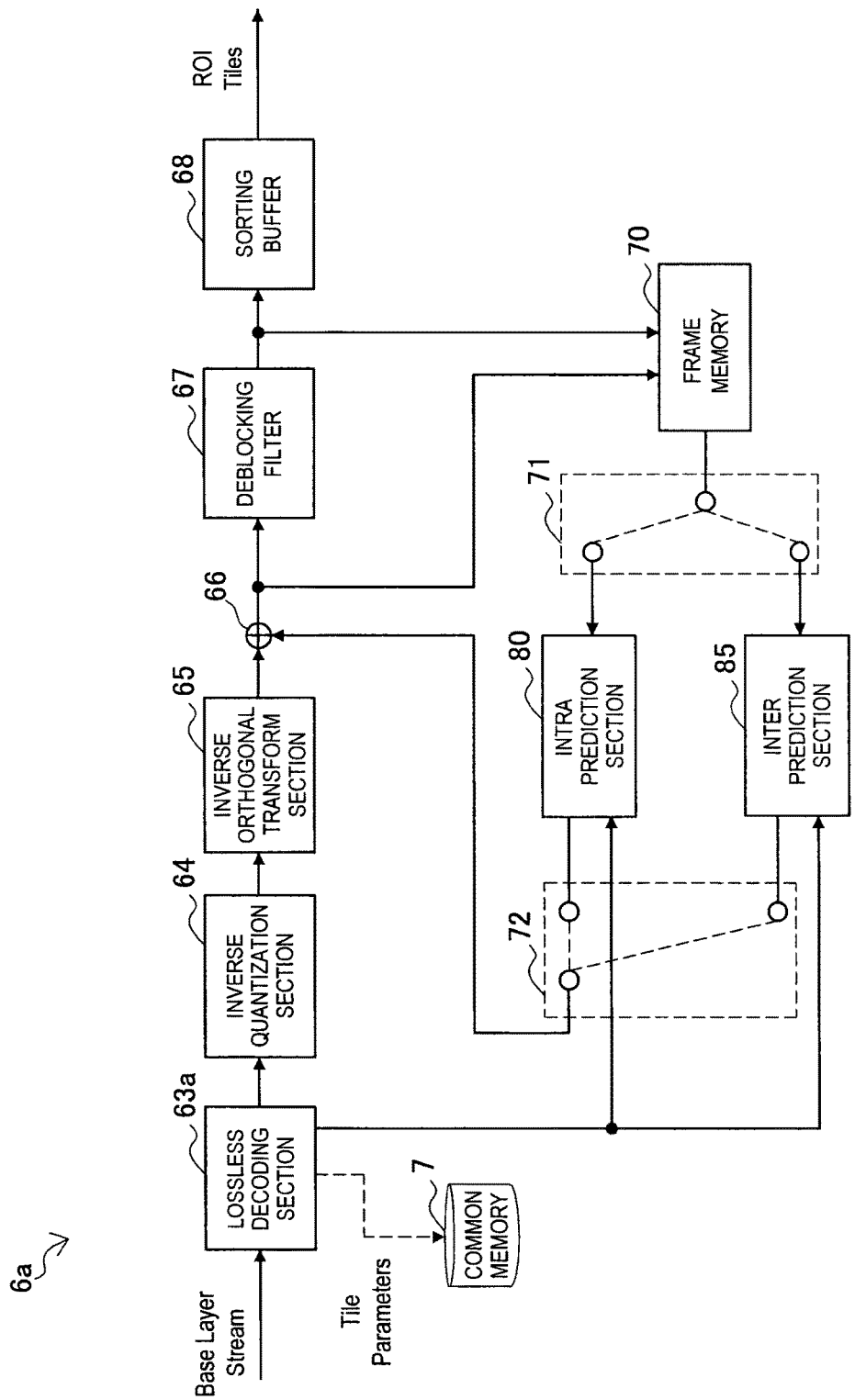
FIG. 20 is a block diagram showing an example of the configuration of a first decoding section illustrated in FIG. 19.

FIG. 20 is a block diagram showing an example of the configuration of the first decoding section 6a illustrated in FIG. 19. Referring to FIG. 20, the first decoding section 6a includes a lossless decoding section 63a, an inverse quantization section 64, an inverse orthogonal transform section 65, an addition section 66, a deblocking filter 67, a sorting buffer 68, a frame memory 70, selectors 71 and 72, an intra prediction section 80, and an inter prediction section 85.

The lossless decoding section 63a decodes the image data of the ROI tile from the encoded stream of the base layer input from the demultiplexing section 5. The lossless decoding section 63a outputs the decoded image data (quantized data) to the inverse quantization section 64. The lossless decoding section 63a acquires the tile parameters inserted into the header region of the encoded stream and stores the acquired tile parameters in the common memory 7. The lossless decoding section 63a outputs the information regarding the intra prediction to the intra prediction section 80. The lossless decoding section 63a outputs the information regarding the inter prediction to the inter prediction section 85.

The inverse quantization section 64 performs the inverse quantization on the quantized data after the decoding performed by the lossless decoding section 63a. The inverse orthogonal transform section 65 performs the inverse orthogonal transform on the transform coefficient data input from the inverse quantization section 64 to generate the predicted error data. The addition section 66 adds the predicted error data input from the inverse orthogonal transform section 65 and the predicted image data input from the selector 72 to generate the decoded image data of the ROI tile. The deblocking filter 67 performs the filtering process to remove the block distortion occurring in the decoded image. The sorting buffer 68 sorts the ROI tile images input in the decoding order from the deblocking filter 67 in the presentation order. Then, the sorting buffer 68 outputs the series of decoded image data of the ROI tiles after the sorting to the combination section 8 or the resolution adjustment section 9.

The frame memory 70 stores the decoded image data of the ROI tiles (before the filtering and after the filtering). The selector 71 switches an output destination of the data from the frame memory 70 between the intra prediction section 80 and the inter prediction section 85 according to the mode information decoded by the lossless decoding section 63a. The selector 72 switches an output source of the predicted image data to be supplied to the addition section 66 between the intra prediction section 80 and the inter prediction section 85 according to the mode information decoded by the lossless decoding section 63a.

The intra prediction section 80 performs the intra prediction based on the information regarding the intra prediction input from the lossless decoding section 63a and the reference image data from the frame memory 70 and outputs the predicted image data to the selector 72. The inter prediction section 85 performs the inter prediction based on the information regarding the inter prediction input from the lossless decoding section 63a and the reference image data from the frame memory 70 and outputs the predicted image data to the selector 72.

(3) Decoding of Enhancement Layer

Figure 21:
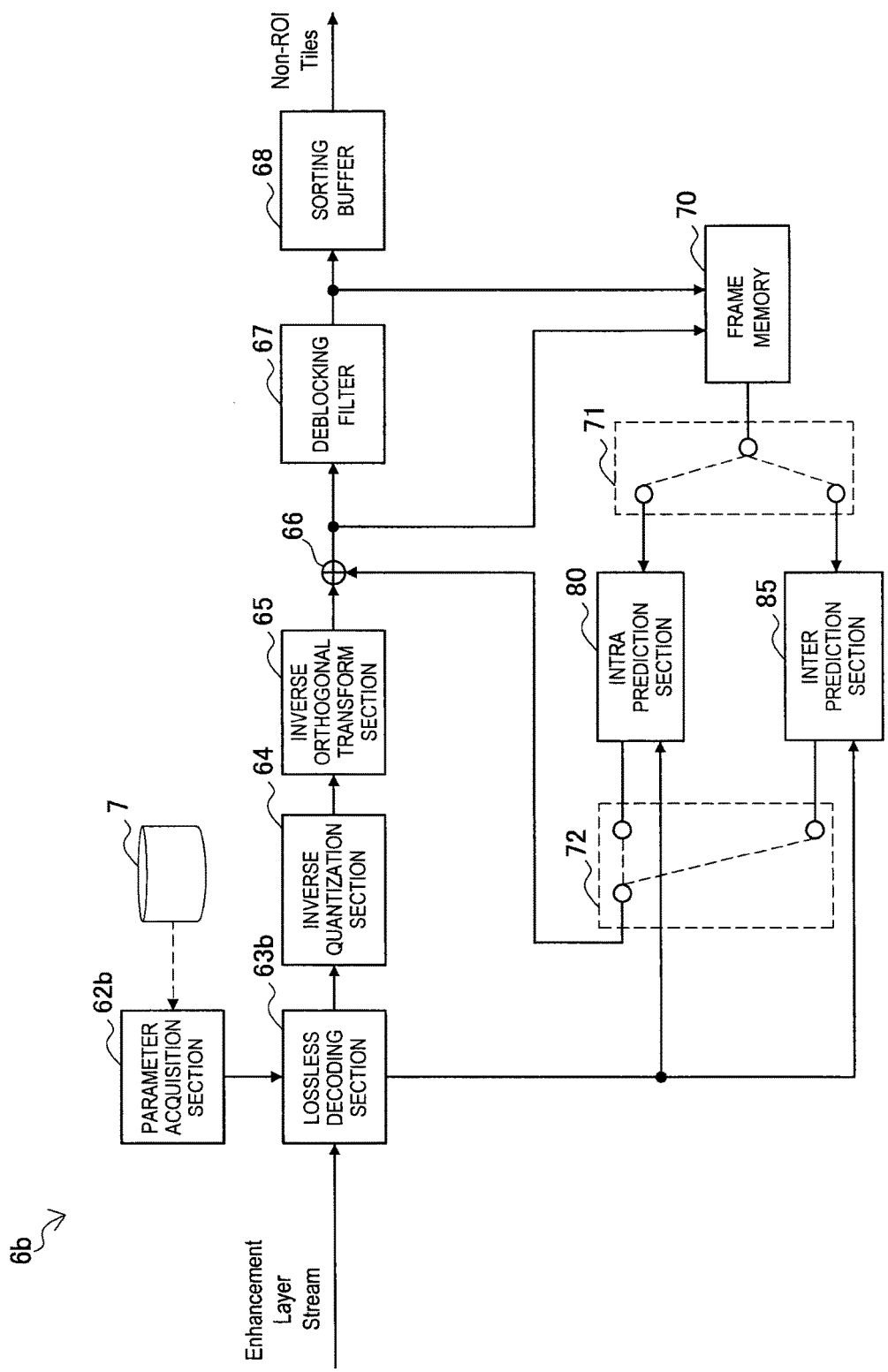
FIG. 21 is a block diagram showing an example of the configuration of a second decoding section illustrated in FIG. 19.

FIG. 21 is a block diagram showing an example of the configuration of the second decoding section 6b illustrated in FIG. 19. Referring to FIG. 21, the second decoding section 6b includes a parameter acquisition section 62b, a lossless decoding section 63b, an inverse quantization section 64, an inverse orthogonal transform section 65, an addition section 66, a deblocking filter 67, a sorting buffer 68, a frame memory 70, selectors 71 and 72, an intra prediction section 80, and an inter prediction section 85.

The parameter acquisition section 62b acquires the above-described tile parameters from the common memory 7. Based on the acquired tile parameters, the parameter acquisition section 62b discriminates the tile partitioning of each decoding target image and the positions of the ROI tile and the non-ROI tile. The parameter acquisition section 62b may acquire the tile parameters by referring to the header region of the multiplexed stream or the encoded stream of the base layer, instead of acquiring the tile parameters from the common memory 7.

The lossless decoding section 63b decodes the image data of the non-ROI tile from the encoded stream of the enhancement layer input from the demultiplexing section 5. Then, the lossless decoding section 63b outputs the decoded image data (quantized data) to the inverse quantization section 64. The lossless decoding section 63b outputs the information regarding the intra prediction to the intra prediction section

80. The lossless decoding section 63*b* outputs the information regarding the inter prediction to the inter prediction section 85.

The inverse quantization section 64 performs the inverse quantization on the quantized data after the decoding performed by the lossless decoding section 63*b*. The inverse orthogonal transform section 65 performs the inverse orthogonal transform on the transform coefficient data input from the inverse quantization section 64 to generate the predicted error data. The addition section 66 adds the predicted error data input from the inverse orthogonal transform section 65 and the predicted image data input from the selector 72 to generate the decoded image data of the non-ROI tile. The deblocking filter 67 performs the filtering process to remove the block distortion occurring in the decoded image. The sorting buffer 68 sorts the non-ROI tile images input in the decoding order from the deblocking filter 67 in the presentation order. Then, the sorting buffer 68 outputs the series of decoded image data of the non-ROI tiles after the sorting to the combination section 8.

At the time of the encoding of the enhancement layer, the frame memory 70 stores all of the decoded image data (before the filtering and after the filtering) including both of the ROI tile and the non-ROI tile. The selector 71 switches the output destination of the data from the frame memory 70 between the intra prediction section 80 and the inter prediction section 85 according to the mode information decoded by the lossless decoding section 63*b*. The selector 72 switches the output source of the predicted image data to be supplied to the addition section 66 between the intra prediction section 80 and the inter prediction section 85 according to the mode information decoded by the lossless decoding section 63*b*.

The intra prediction section 80 performs the intra prediction based on the information regarding the intra prediction input from the lossless decoding section 63*b* and the reference image data from the frame memory 70 and outputs the predicted image data to the selector 72. The inter prediction section 85 performs the inter prediction based on the information regarding the inter prediction input from the lossless decoding section 63*b* and the reference image data from the frame memory 70 and outputs the predicted image data to the selector 72.

[3-5. Process Flow at the Time of Decoding]

Figure 22:
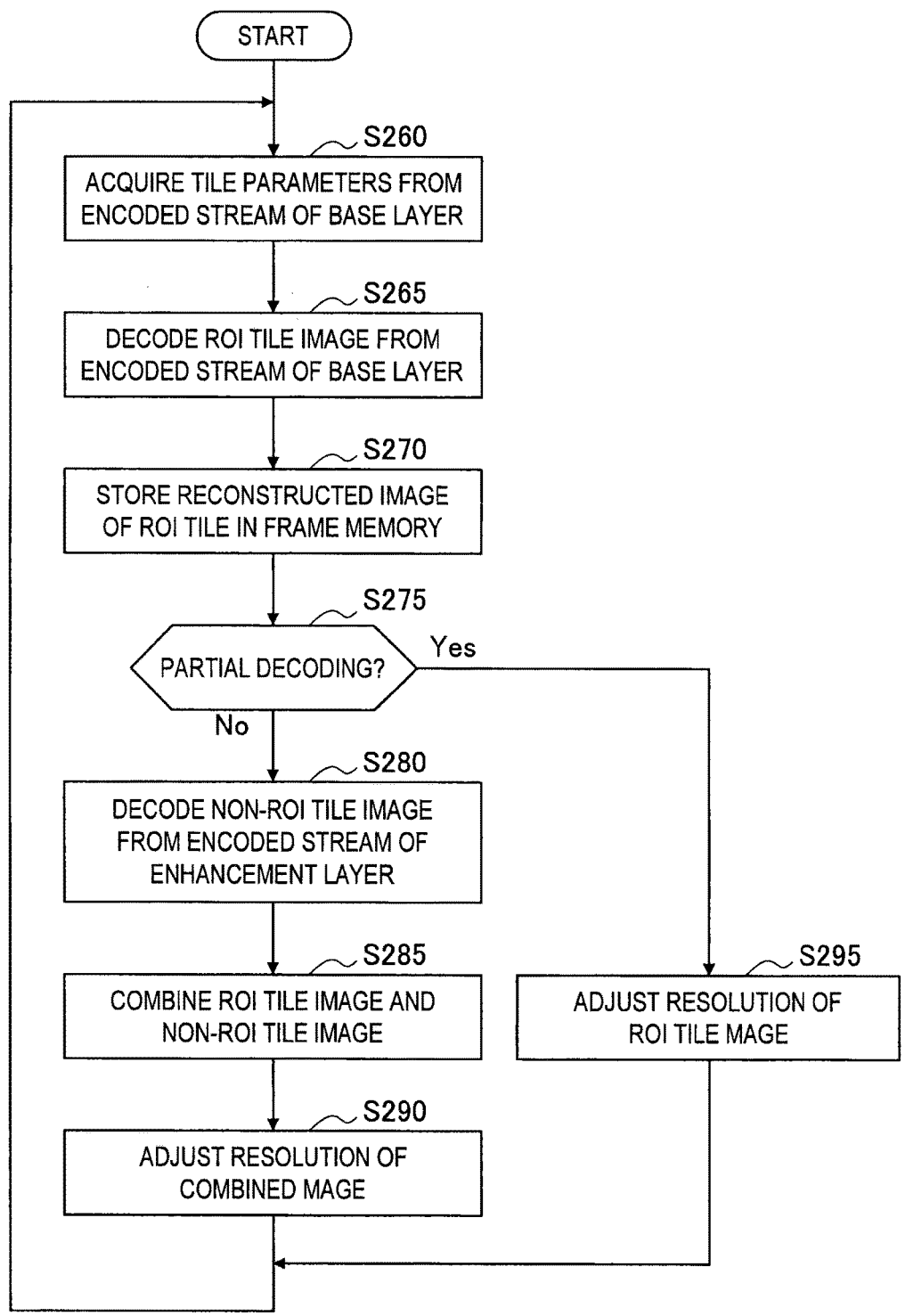
FIG. 22 is a flow chart showing an example of a process flow at the time of decoding according to the second embodiment.

FIG. 22 is a flow chart showing an example of a process flow at the time of the decoding according to the embodiment. The process illustrated in FIG. 22 is repeated on each decoding target image.

Referring to FIG. 22, the first decoding section 6*a* first acquires the tile parameters from the encoded stream of the base layer (step S260). The tile parameters acquired herein are exchanged with the second decoding section 6*b* via the common memory 7.

Next, the first decoding section 6*a* decodes the ROI tile image from the encoded stream of the base layer (step S265). The reconstructed image of the ROI tile is stored in the frame memory 70 (step S270).

Then, the determination section 90 determines whether the partial decoding is performed (step S275). Here, when it is determined that the partial decoding is performed, the process proceeds to step S295. Conversely, when it is determined that the entire decoding is performed, the process proceeds to step S280.

When it is determined that the entire decoding is performed, the second decoding section 6*b* decodes the non-ROI tile image from the encoded stream of the enhancement layer (step S280). The second decoding section 6*b* discriminates the positions of the ROI tile and the non-ROI tile based on the tile parameters acquired in step S260 and skips the decoding process on the ROI tile which has already been decoded by the first decoding section 6*a*. Next, the combination section 8 combines the ROI tile image generated by the first decoding section 6*a* and the non-ROI tile image generated by the second decoding section 6*b* (step S285). Then, the resolution adjustment section 9 adjusts the resolution of the combined entire decoded image (step S290).

Conversely, when it is determined that the partial decoding is performed, the second decoding section 6*b* does not decode the non-ROI tile image. The resolution adjustment section 9 adjusts the resolution of the decoded image of the ROI tile generated by the first decoding section 6*a* (step S295).

Then, the image of which the resolution is adjusted in step S290 or step S295 is displayed on the display.

<4. Example Application>

The technology according to the embodiments of the present disclosure may be applied to various electronic appliances such as a transmitter and a receiver for satellite broadcasting, cable broadcasting such as cable TV, distribution on the Internet, distribution to terminals via cellular communication, and the like, a recording device that records images in a medium such as an optical disc, a magnetic disk or a flash memory, a reproduction device that reproduces images from such storage medium, and the like. Four example applications will be described below.

[4-1. First Application Example]

Figure 23:
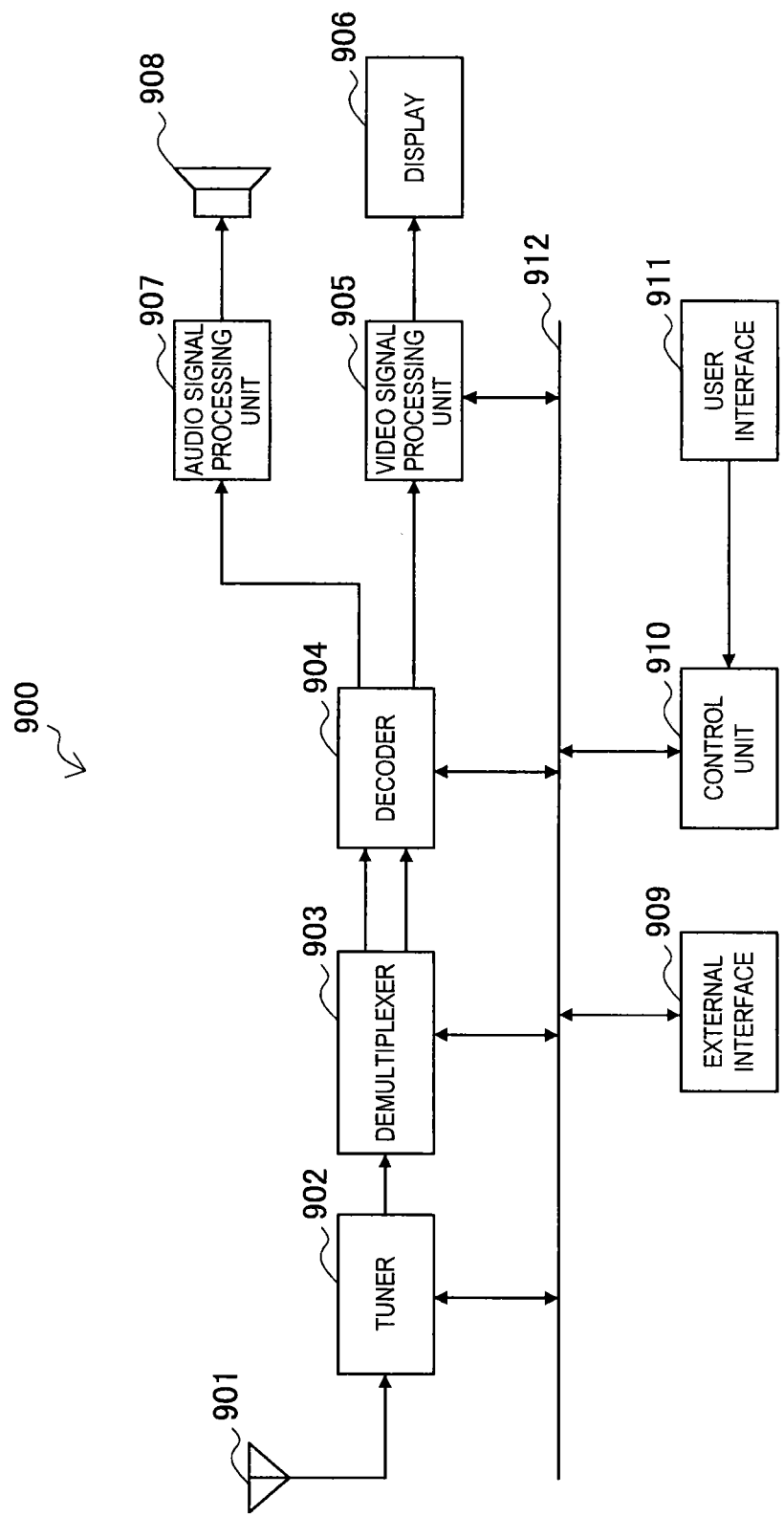
FIG. 23 is a block diagram showing an example of a schematic configuration of a television.

FIG. 23 illustrates an example of a schematic configuration of a television device applying the aforementioned first or second embodiment. A television device 900 includes an antenna 901, a tuner 902, a demultiplexer 903, a decoder 904, a video signal processing unit 905, a display 906, an audio signal processing unit 907, a speaker 908, an external interface 909, a control unit 910, a user interface 911, and a bus 912.

The tuner 902 extracts a signal of a desired channel from a broadcast signal received through the antenna 901 and demodulates the extracted signal. The tuner 902 then outputs an encoded bit stream obtained by the demodulation to the demultiplexer 903. That is, the tuner 902 has a role as transmission means receiving the encoded stream in which an image is encoded, in the television device 900.

The demultiplexer 903 isolates a video stream and an audio stream in a program to be viewed from the encoded bit stream and outputs each of the isolated streams to the decoder 904. The demultiplexer 903 also extracts auxiliary data such as an EPG (Electronic Program Guide) from the encoded bit stream and supplies the extracted data to the control unit 910. Here, the demultiplexer 903 may descramble the encoded bit stream when it is scrambled.

The decoder 904 decodes the video stream and the audio stream that are input from the demultiplexer 903. The decoder 904 then outputs video data generated by the decoding process to the video signal processing unit 905. Furthermore, the decoder 904 outputs audio data generated by the decoding process to the audio signal processing unit 907.

The video signal processing unit 905 reproduces the video data input from the decoder 904 and displays the video on the display 906. The video signal processing unit 905 may also display an application screen supplied through the network on the display 906. The video signal processing unit 905 may further perform an additional process such as noise reduction on the video data according to the setting. Furthermore, the video signal processing unit 905 may generate an image of a GUI (Graphical User Interface) such as a menu, a button, or a cursor and superpose the generated image onto the output image.

The display 906 is driven by a drive signal supplied from the video signal processing unit 905 and displays video or an image on a video screen of a display device (such as a liquid crystal display, a plasma display, or an OELD (Organic ElectroLuminescence Display)).

The audio signal processing unit 907 performs a reproducing process such as D/A conversion and amplification on the audio data input from the decoder 904 and outputs the audio from the speaker 908. The audio signal processing unit 907 may also perform an additional process such as noise reduction on the audio data.

The external interface 909 is an interface that connects the television device 900 with an external device or a network. For example, the decoder 904 may decode a video stream or an audio stream received through the external interface 909. This means that the external interface 909 also has a role as the transmission means receiving the encoded stream in which an image is encoded, in the television device 900.

The control unit 910 includes a processor such as a Central Processing Unit (CPU) and a memory such as a RAM and a ROM. The memory stores a program executed by the CPU, program data, EPG data, and data acquired through the network. The program stored in the memory is read by the CPU at the start-up of the television device 900 and executed, for example. By executing the program, the CPU controls the operation of the television device 900 in accordance with an operation signal that is input from the user interface 911, for example.

The user interface 911 is connected to the control unit 910. The user interface 911 includes a button and a switch for a user to operate the television device 900 as well as a reception part which receives a remote control signal, for example. The user interface 911 detects a user operation through these components, generates the operation signal, and outputs the generated operation signal to the control unit 910.

The bus 912 mutually connects the tuner 902, the demultiplexer 903, the decoder 904, the video signal processing unit 905, the audio signal processing unit 907, the external interface 909, and the control unit 910.

In the television device 900 having such a configuration, the decoder 904 has a function of the partial decoding according to the above-described embodiment. Thus, when an image is decoded in the television device 900, it is possible to dynamically select the decoding of only the ROI tile or the decoding of the entire image.

[4-2. Second Application Example]

Figure 24:
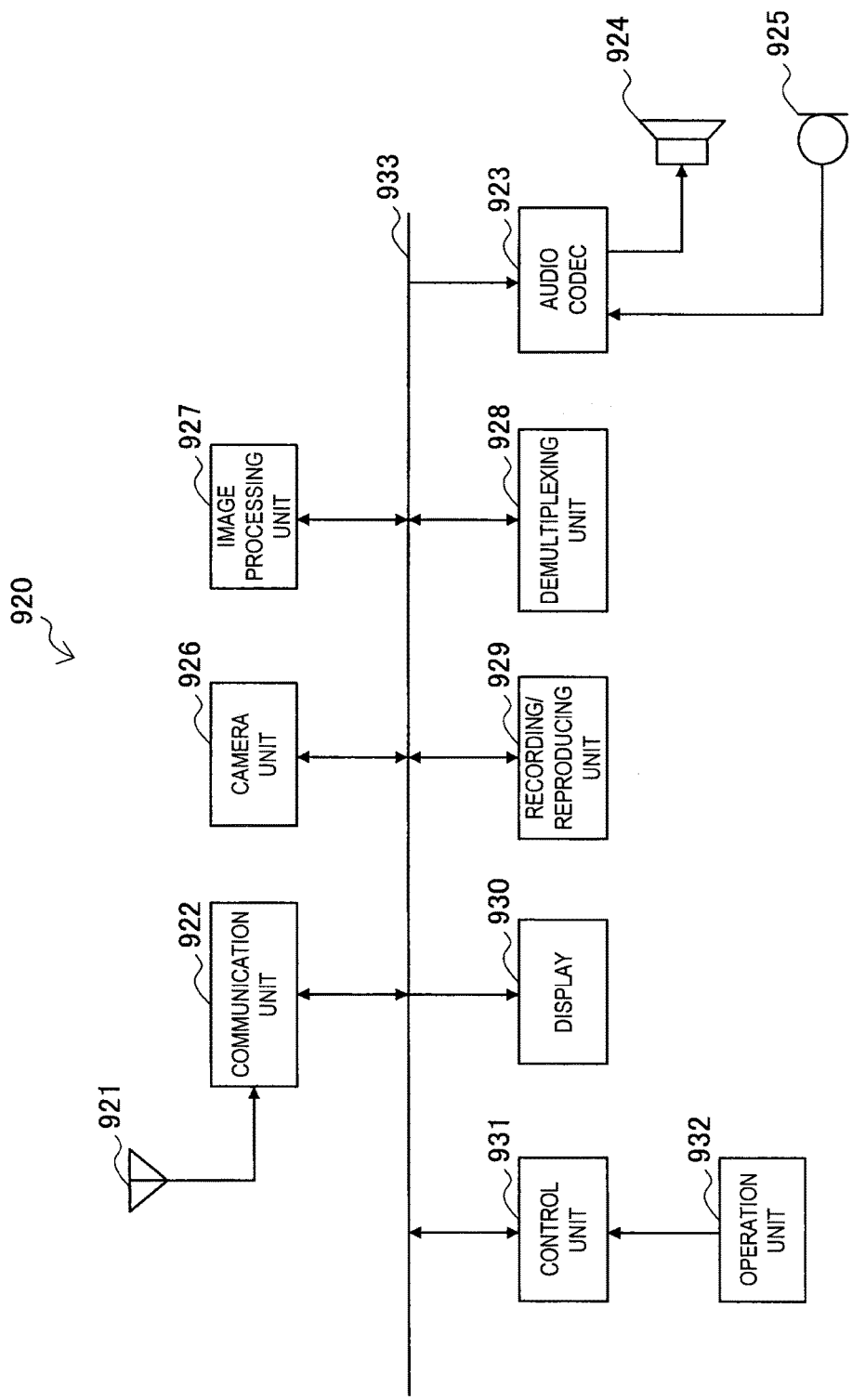
FIG. 24 is a block diagram showing an example of a schematic configuration of a mobile phone.

FIG. 24 illustrates an example of a schematic configuration of a mobile telephone applying the aforementioned first or second embodiment. A mobile telephone 920 includes an antenna 921, a communication unit 922, an audio codec 923, a speaker 924, a microphone 925, a camera unit 926, an image processing unit 927, a demultiplexing unit 928, a recording/reproducing unit 929, a display 930, a control unit 931, an operation unit 932, and a bus 933.

The antenna 921 is connected to the communication unit 922. The speaker 924 and the microphone 925 are connected to the audio codec 923. The operation unit 932 is connected to the control unit 931. The bus 933 mutually connects the communication unit 922, the audio codec 923, the camera unit 926, the image processing unit 927, the demultiplexing unit 928, the recording/reproducing unit 929, the display 930, and the control unit 931.

The mobile telephone 920 performs an operation such as transmitting/receiving an audio signal, transmitting/receiving an electronic mail or image data, imaging an image, or recording data in various operation modes including an audio call mode, a data communication mode, a photography mode, and a videophone mode.

In the audio call mode, an analog audio signal generated by the microphone 925 is supplied to the audio codec 923. The audio codec 923 then converts the analog audio signal into audio data, performs A/D conversion on the converted audio data, and compresses the data. The audio codec 923 thereafter outputs the compressed audio data to the communication unit 922. The communication unit 922 encodes and modulates the audio data to generate a transmission signal. The communication unit 922 then transmits the generated transmission signal to a base station (not shown) through the antenna 921. Furthermore, the communication unit 922 amplifies a radio signal received through the antenna 921, converts a frequency of the signal, and acquires a reception signal. The communication unit 922 thereafter demodulates and decodes the reception signal to generate the audio data and output the generated audio data to the audio codec 923. The audio codec 923 expands the audio data, performs D/A conversion on the data, and generates the analog audio signal. The audio codec 923 then outputs the audio by supplying the generated audio signal to the speaker 924.

In the data communication mode, for example, the control unit 931 generates character data configuring an electronic mail, in accordance with a user operation through the operation unit 932. The control unit 931 further displays a character on the display 930. Moreover, the control unit 931 generates electronic mail data in accordance with a transmission instruction from a user through the operation unit 932 and outputs the generated electronic mail data to the communication unit 922. The communication unit 922 encodes and modulates the electronic mail data to generate a transmission signal. Then, the communication unit 922 transmits the generated transmission signal to the base station (not shown) through the antenna 921. The communication unit 922 further amplifies a radio signal received through the antenna 921, converts a frequency of the signal, and acquires a reception signal. The communication unit 922 thereafter demodulates and decodes the reception signal, restores the electronic mail data, and outputs the restored electronic mail data to the control unit 931. The control unit 931 displays the content of the electronic mail on the display 930 as well as stores the electronic mail data in a storage medium of the recording/reproducing unit 929.

The recording/reproducing unit 929 includes an arbitrary storage medium that is readable and writable. For example, the storage medium may be a built-in storage medium such as a RAM or a flash memory, or may be an externally-mounted storage medium such as a hard disk, a magnetic disk, a magneto-optical disk, an optical disk, a USB (Unallocated Space Bitmap) memory, or a memory card.

In the photography mode, for example, the camera unit 926 images an object, generates image data, and outputs the generated image data to the image processing unit 927. The image processing unit 927 encodes the image data input from the camera unit 926 and stores an encoded stream in the storage medium of the storing/reproducing unit 929.

In the videophone mode, for example, the demultiplexing unit 928 multiplexes a video stream encoded by the image processing unit 927 and an audio stream input from the audio codec 923, and outputs the multiplexed stream to the communication unit 922. The communication unit 922 encodes and modulates the stream to generate a transmission signal. The communication unit 922 subsequently transmits the generated transmission signal to the base station (not shown) through the antenna 921. Moreover, the communication unit 922 amplifies a radio signal received through the antenna 921, converts a frequency of the signal, and acquires a reception signal. The transmission signal and the reception signal can include an encoded bit stream. Then, the communication unit 922 demodulates and decodes the reception signal to restore the stream, and outputs the restored stream to the demultiplexing unit 928. The demultiplexing unit 928 isolates the video stream and the audio stream from the input stream and outputs the video stream and the audio stream to the image processing unit 927 and the audio codec 923, respectively. The image processing unit 927 decodes the video stream to generate video data. The video data is then supplied to the display 930, which displays a series of images. The audio codec 923 expands and performs D/A conversion on the audio stream to generate an analog audio signal. The audio codec 923 then supplies the generated audio signal to the speaker 924 to output the audio.

The image processing unit 927 in the mobile telephone 920 configured in the aforementioned manner has a function of the partial decoding according to the aforementioned embodiment. Thus, when an image is decoded in the mobile telephone 920 or an image is decoded in a device communicating with the mobile telephone 920, it is possible to dynamically select the decoding of only the ROI tile or the decoding of the entire image.

[4-3. Third Application Example]

Figure 25:
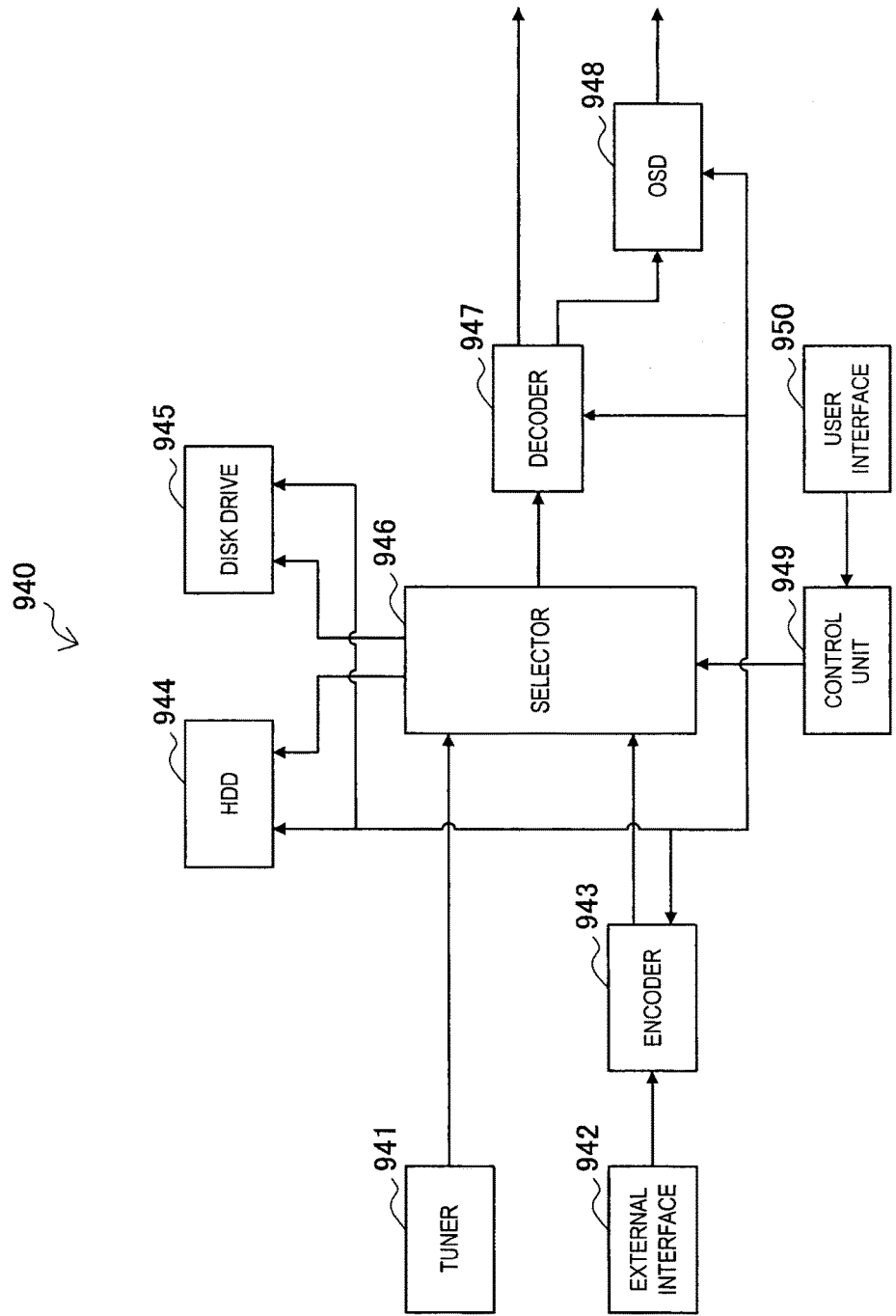
FIG. 25 is a block diagram showing an example of a schematic configuration of a recording/reproduction device.

FIG. 25 illustrates an example of a schematic configuration of a recording/reproducing device applying the aforementioned first or second embodiment. A recording/reproducing device 940 encodes audio data and video data of a broadcast program received and records the data into a recording medium, for example. The recording/reproducing device 940 may also encode audio data and video data acquired from another device and record the data into the recording medium, for example. In response to a user instruction, for example, the recording/reproducing device 940 reproduces the data recorded in the recording medium on a monitor and a speaker. The recording/reproducing device 940 at this time decodes the audio data and the video data.

The recording/reproducing device 940 includes a tuner 941, an external interface 942, an encoder 943, an HDD (Hard Disk Drive) 944, a disk drive 945, a selector 946, a decoder 947, an OSD (On-Screen Display) 948, a control unit 949, and a user interface 950.

The tuner 941 extracts a signal of a desired channel from a broadcast signal received through an antenna (not shown) and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface which connects the recording/reproducing device 940 with an external device or a network. The external interface 942 may be, for example, an IEEE 1394 interface, a network interface, a USB interface, or a flash memory interface. The video data and the audio data received through the external interface 942 are input to the encoder 943, for example. That is, the external interface 942 has a role as transmission means in the recording/reproducing device 940.

The encoder 943 encodes the video data and the audio data when the video data and the audio data input from the external interface 942 are not encoded. The encoder 943 thereafter outputs an encoded bit stream to the selector 946.

The HDD 944 records, into an internal hard disk, the encoded bit stream in which content data such as video and audio is compressed, various programs, and other data. The HDD 944 reads these data from the hard disk when reproducing the video and the audio.

The disk drive 945 records and reads data into/from a recording medium which is mounted to the disk drive. The recording medium mounted to the disk drive 945 may be, for example, a DVD disk (such as DVD-Video, DVD-RAM, DVD-R, DVD-RW, DVD+R, or DVD+RW) or a Blu-ray (Registered Trademark) disk.

The selector 946 selects the encoded bit stream input from the tuner 941 or the encoder 943 when recording the video and audio, and outputs the selected encoded bit stream to the HDD 944 or the disk drive 945. When reproducing the video and audio, on the other hand, the selector 946 outputs the encoded bit stream input from the HDD 944 or the disk drive 945 to the decoder 947.

The decoder 947 decodes the encoded bit stream to generate the video data and the audio data. The decoder 904 then outputs the generated video data to the OSD 948 and the generated audio data to an external speaker.

The OSD 948 reproduces the video data input from the decoder 947 and displays the video. The OSD 948 may also superpose an image of a GUI such as a menu, a button, or a cursor onto the video displayed.

The control unit 949 includes a processor such as a CPU and a memory such as a RAM and a ROM. The memory stores a program executed by the CPU as well as program data. The program stored in the memory is read by the CPU at the start-up of the recording/reproducing device 940 and executed, for example. By executing the program, the CPU controls the operation of the recording/reproducing device 940 in accordance with an operation signal that is input from the user interface 950, for example.

The user interface 950 is connected to the control unit 949. The user interface 950 includes a button and a switch for a user to operate the recording/reproducing device 940 as well as a reception part which receives a remote control signal, for example. The user interface 950 detects a user operation through these components, generates the operation signal, and outputs the generated operation signal to the control unit 949.

The encoder 943 and the decoder 947 in the recording/reproducing device 940 configured in the aforementioned manner have a function of the partial decoding according to the aforementioned embodiment. Thus, when an image is decoded in the recording/reproducing device 940 or an image recorded by the recording/reproducing device 940 is decoded in another device, it is possible to dynamically select the decoding of only the ROI tile or the decoding of the entire image.

[4-4. Fourth Application Example]

Figure 26:
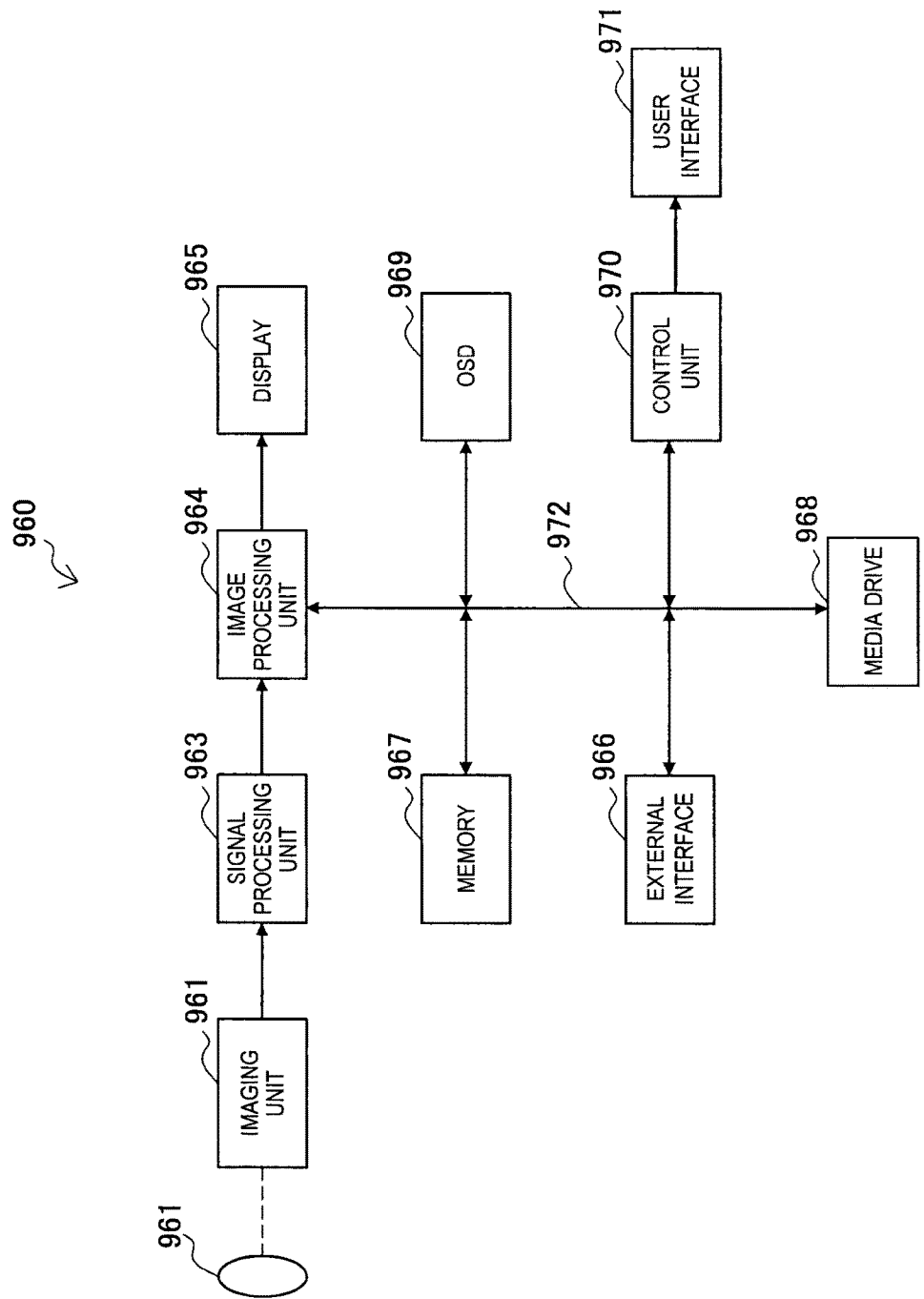
FIG. 26 is a block diagram showing an example of a schematic configuration of an image capturing device.

FIG. 26 shows an example of a schematic configuration of an image capturing device applying the aforementioned first or second embodiment. An imaging device 960 images an object, generates an image, encodes image data, and records the data into a recording medium.

The imaging device 960 includes an optical block 961, an imaging unit 962, a signal processing unit 963, an image processing unit 964, a display 965, an external interface 966, a memory 967, a media drive 968, an OSD 969, a control unit 970, a user interface 971, and a bus 972.

The optical block 961 is connected to the imaging unit 962. The imaging unit 962 is connected to the signal processing unit 963. The display 965 is connected to the image processing unit 964. The user interface 971 is connected to the control unit 970. The bus 972 mutually connects the image processing unit 964, the external interface 966, the memory 967, the media drive 968, the OSD 969, and the control unit 970.

The optical block 961 includes a focus lens and a diaphragm mechanism. The optical block 961 forms an optical image of the object on an imaging surface of the imaging unit 962. The imaging unit 962 includes an image sensor such as a CCD (Charge Coupled Device) or a CMOS (Complementary Metal Oxide Semiconductor) and performs photoelectric conversion to convert the optical image formed on the imaging surface into an image signal as an electric signal. Subsequently, the imaging unit 962 outputs the image signal to the signal processing unit 963.

The signal processing unit 963 performs various camera signal processes such as a knee correction, a gamma correction and a color correction on the image signal input from the imaging unit 962. The signal processing unit 963 outputs the image data, on which the camera signal process has been performed, to the image processing unit 964.

The image processing unit 964 encodes the image data input from the signal processing unit 963 and generates the encoded data. The image processing unit 964 then outputs the generated encoded data to the external interface 966 or the media drive 968. The image processing unit 964 also decodes the encoded data input from the external interface 966 or the media drive 968 to generate image data. The image processing unit 964 then outputs the generated image data to the display 965. Moreover, the image processing unit 964 may output to the display 965 the image data input from the signal processing unit 963 to display the image. Furthermore, the image processing unit 964 may superpose display data acquired from the OSD 969 onto the image that is output on the display 965.

The OSD 969 generates an image of a GUI such as a menu, a button, or a cursor and outputs the generated image to the image processing unit 964.

The external interface 966 is configured as a USB input/output terminal, for example. The external interface 966 connects the imaging device 960 with a printer when printing an image, for example. Moreover, a drive is connected to the external interface 966 as needed. A removable medium such as a magnetic disk or an optical disk is mounted to the drive, for example, so that a program read from the removable medium can be installed to the imaging device 960. The external interface 966 may also be configured as a network interface that is connected to a network such as a LAN or the Internet. That is, the external interface 966 has a role as transmission means in the imaging device 960.

The recording medium mounted to the media drive 968 may be an arbitrary removable medium that is readable and writable such as a magnetic disk, a magneto-optical disk, an optical disk, or a semiconductor memory. Furthermore, the recording medium may be fixedly mounted to the media drive 968 so that a non-transportable storage unit such as a built-in hard disk drive or an SSD (Solid State Drive) is configured, for example.

The control unit 970 includes a processor such as a CPU and a memory such as a RAM and a ROM. The memory stores a program executed by the CPU as well as program data. The program stored in the memory is read by the CPU at the start-up of the imaging device 960 and then executed. By executing the program, the CPU controls the operation of the imaging device 960 in accordance with an operation signal that is input from the user interface 971, for example.

The user interface 971 is connected to the control unit 970. The user interface 971 includes a button and a switch for a user to operate the imaging device 960, for example. The user interface 971 detects a user operation through these components, generates the operation signal, and outputs the generated operation signal to the control unit 970.

The image processing unit 964 in the imaging device 960 configured in the aforementioned manner has a function of the partial decoding according to the aforementioned embodiment. Thus, when an image captured or recorded in the imaging device 960 is decoded, it is possible to dynamically select the decoding of only the ROI tile or the decoding of the entire image.

<5. Conclusion>

The embodiments of the technology in the present disclosure have been described in detail above with reference to FIGS. 3A to 26. In the technology in the present disclosure, an image is partitioned into the ROI (Region of Interest) tile and the non-ROI tile by using the tile partitioning of the HEVC scheme, and the tile parameter indicating which tile is the ROI tile is inserted into the encoded stream. Accordingly, the structure in which the decoder can perform the partial decoding only on the ROI tile is realized. Thus, a high-resolution image can be supplied to a terminal having a high ability and a low-resolution image can be supplied to a terminal having a relatively low ability without redundantly preparing encoded streams for respective individual resolutions.

The new tile parameter indicating that the partial decoding can be performed only on the ROI tile can be inserted into an SPS, a PPS, an SEI, or a slice header of an encoded stream. Accordingly, for example, it is possible to flexibly designate presence or absence of an ROI tile and the position of the ROI tile according to use of the partial decoding. For example, in use in which all of the images include at least one ROI tile, an encoding amount of the tile parameters can be reduced by comprehensively indicating that the ROI tile is present in an SPS.

According to the above-described embodiments, the tile partitioning is decided according to the position of the ROI set in the encoding target image. Accordingly, in use in which the ROI is temporally moved, a moving image properly tracking the moving ROI can also be obtained through the partial decoding. For example, by handling a human region detected in an image as an ROI, only human images pictured in images of a monitoring camera can be browsed with a terminal having low performance. Further, when a plurality of sites are connected with communication channels with different bandwidths, for example, in use of a video conference system, the high-resolution images from the other sites can be entirely decoded in sites with sufficiently large bandwidth and only a region of a speaker pictured in the high-resolution images can be partially decoded in sites with narrow bandwidths.

According to the above-described embodiments, when an encoder side performs the inter prediction on an ROI tile, a non-ROI tile of a reference image is prohibited from being referred to. When the reference image does not include an ROI tile, the inter prediction is not performed and only the intra prediction is performed. Accordingly, the series of image data of the ROI tile can be decoded without reference to the non-ROI tile.

According to the second embodiment, the region scalability is realized as a kind of scalable encoding. In this case, the encoded stream of the base layer can be encoded and decoded according to an image coding scheme which does not support the tile partitioning. Accordingly, only the ROI image is supplied to a terminal which supports only an image coding scheme of the related art, such as the MPEG2 scheme or the AVC scheme and the entire high-resolution image including the ROI image can also be supplied to a terminal which supports the HEVC scheme. Since the image data of the ROI tile is omitted in the encoded stream of the enhancement layer, it is possible to ensure partial compatibility between the image coding schemes while avoiding redundant encoding of the ROI tile image and suppressing an increase in the encoding amount.

The terms "CU," "PU," and "TU" described in the present specification refer to logical units including a syntax associated with an individual block in HEVC. When only individual blocks which are parts of an image are focused on, the blocks may be substituted with the terms "coding block (CB)," "prediction block (PB)," and "transform block (TB)." A CB is formed by hierarchically dividing a coding tree block (CTB) in a quad-tree shape. One quad-tree corresponds to the CTB and a logical unit corresponding to the CTB is referred to as a coding tree unit (CTU). The CTB and the CB in HEVC have a role similar to that of a macro block in H.264/AVC in that the CTB and the CB are processing units of an encoding process. However, the CTB and the CB are different from the macro block in that the sizes of the CTB and the CB are not fixed (the size of the macro block normally has 16×16 pixels). The size of the CTB is selected from a size of 16×16 pixels, a size of 32×32 pixels, and a size of 64×64 pixels and is designated by a parameter in an encoded stream. The size of the CB can be changed according to a division depth of the CTB.

Mainly described herein is the example where the various pieces of information such as the information related to intra prediction and the information related to inter prediction are multiplexed to the header of the encoded stream and transmitted from the encoding side to the decoding side. The method of transmitting these pieces of information however is not limited to such example. For example, these pieces of information may be transmitted or recorded as separate data associated with the encoded bit stream without being multiplexed to the encoded bit stream. Here, the term "association" means to allow the image included in the bit stream (may be a part of the image such as a slice or a block) and the information corresponding to the current image to establish a link when decoding. Namely, the information may be transmitted on a different transmission path from the image (or the bit stream). The information may also be recorded in a different recording medium (or a different recording area in the same recording medium) from the image (or the bit stream). Furthermore, the information and the image (or the bit stream) may be associated with each other by an arbitrary unit such as a plurality of frames, one frame, or a portion within a frame.

The preferred embodiments of the present disclosure have been described above with reference to the accompanying drawings, whilst the present disclosure is not limited to the above examples, of course. A person skilled in the art may find various alternations and modifications within the scope of the appended claims, and it should be understood that they will naturally come under the technical scope of the present disclosure.

Additionally, the present technology may also be configured as below.

(1)
An image decoding device including:
an acquisition section configured to acquire a first parameter indicating which tile is a region-of-interest tile from an encoded stream encoded by partitioning an image into a plurality of tiles; and
a decoding section configured to decode at least one of the region-of-interest tile and a non-region-of-interest tile of the image based on the first parameter acquired by the acquisition section.

(2)
The image decoding device according to (1), wherein the acquisition section acquires the first parameter from an SPS (Sequence Parameter Set) or a PPS (Picture Parameter Set) of the encoded stream.

(3)
The image decoding device according to (1), wherein the acquisition section acquires the first parameter from an SEI (Supplemental Enhancement Information) of the encoded stream.

(4)
The image decoding device according to (1), wherein the acquisition section acquires the first parameter from a slice header of the encoded stream.

(5)
The image decoding device according to any one of (1) to (4), wherein the acquisition section acquires the first parameter in regard to an image indicated by a second parameter which indicates that the region-of-interest tile is included and is acquired from the encoded stream.

(6)
The image decoding device according to any one of (1) to (5), wherein the image is partitioned into the plurality of tiles at the time of encoding according to a position of the region-of-interest set in the image.

(7)
The image decoding device according to (6), wherein the region-of-interest tile is a tile including a human region detected in each image.

(8)
The image decoding device according to any one of (1) to (7), further including:
an inter prediction section configured to cancel an offset which is dependent on a position of the region-of-interest tile and is an offset of motion vector information acquired from the encoded stream and perform inter prediction based on the motion vector information of which the offset is cancelled.

(9)
The image decoding device according to any one of (1) to (8), wherein the decoding section decodes the region-of-interest tile without decoding the non-region-of-interest tile when partial decoding is performed.

(10)
The image decoding device according to any one of (1) to (8),
wherein the decoding section decodes the encoded stream which is a stream of an enhancement layer in which image data of the region-of-interest tile is omitted to generate image data of the non-region-of-interest tile, and
wherein the image decoding device further includes:
a base layer decoding section configured to decode a stream of a base layer to generate the image data of the region-of-interest tile; and
a combining section configured to combine the image data of the region-of-interest tile and the image data of the non-region-of-interest tile to restore the image.

(11)
The image decoding device according to (10), wherein the base layer decoding section decodes the stream of the base layer according to a coding scheme which does not support tile partitioning.

(12)
The image decoding device according to (11),
wherein the decoding section decodes the stream of the enhancement layer according to an HEVC (High Efficiency Video Coding) scheme, and
wherein the base layer decoding section decodes the stream of the base layer according to an MPEG2 scheme or an AVC (Advanced Video Coding) scheme.

(13)
The image decoding device according to any one of (9) to (12), further including:
a determination section configured to determine whether partial decoding is performed according to performance or a kind of device, a communication bandwidth, or user designation,
wherein only the region-of-interest tile of the image is decoded when the determination section determines that the partial decoding is performed.

(14)
The image decoding device according to (13), further including:
a resolution adjustment section configured to generate a display image by increasing a resolution of a decoded image of the region-of-interest tile generated through the partial decoding.

(15)
The image decoding device according to (13), further including:
a resolution adjustment section configured to generate a display image by decreasing a resolution of a decoded image of the region-of-interest tile and the non-region-of-interest tile generated through entire decoding.

(16)
An image decoding method including:
acquiring a first parameter indicating which tile is a region-of-interest tile from an encoded stream encoded by partitioning an image into a plurality of tiles; and
a decoding section configured to decode at least one of the region-of-interest tile and a non-region-of-interest tile of the image based on the acquired first parameter.

(17)
An image encoding device including:
a partitioning section configured to partition an image into a plurality of tiles including a region-of-interest tile; and
an encoding section configured to insert a first parameter indicating which tile is the region-of-interest tile into an encoded stream generated by encoding the image for each of the tiles.

(18)
The image encoding device according to (17), wherein the encoding section inserts the first parameter into an SPS (Sequence Parameter Set) or a PPS (Picture Parameter Set) of the encoded stream.

(19)
The image encoding device according to (17), wherein the encoding section inserts the first parameter into an SEI (Supplemental enhancement Information) of the encoded stream.

(20)
The image encoding device according to (17), wherein the encoding section inserts the first parameter into a slice header of the encoded stream.

(21)
The image encoding device according to claim 17, wherein the encoding section further inserts a second parameter indicating that the region-of-interest tile is included in each image into the encoded stream.

(22)
The image encoding device according to any one of (17) to (21), wherein the partitioning section sets a region of interest in each image and determine the tile partitioning according to a position of the set region of interest.

(23)
The image encoding device according to (22), wherein the partitioning section sets the region of interest in each image by performing human detection on each image.

(24)
The image encoding device according to any one of (17) to (23), wherein the image encoding device further includes an inter prediction section configured to perform inter prediction on an encoding target image, and a control section configured to cause the inter prediction section to perform the inter prediction in a prediction unit in a region-of-interest tile of the encoding target image without reference to a non-region-of-interest tile of a reference image.

(25)
The image encoding device according to (24), wherein the inter prediction section generates motion vector information offset depending on a position of a region-of-interest tile of the reference image in the prediction unit in the region-of-interest tile of the encoding target image.

(26)
The image encoding device according to (24) or (25), wherein the control section causes the inter prediction section to perform the inter prediction in the prediction unit in the non-region-of-interest tile of the encoding target image regardless of whether any tile of the reference image is the region-of-interest tile.

(27)
The image encoding device according to any one of (24) to (26), wherein, when the reference image does not include the region-of-interest tile, the control section causes the inter prediction section not to perform the inter prediction in the prediction unit in the region-of-interest tile of the encoding target image.

(28)
The image encoding device according to any one of (17) to (27), wherein the encoding section encodes both of image data of the region-of-interest tile and image data of the non-region-of-interest tile in one encoded stream.

(29)
The image encoding device according to any one of (17) to (27), wherein the encoding section generates the encoded stream as a stream of an enhancement layer in which the image data of the region-of-interest tile is omitted. The image encoding device further includes a base layer encoding section configured to generate a stream of a base layer by encoding the image data of the region-of-interest tile and a multiplexing section configured to generate a multiplexed stream by multiplexing the stream of the base layer and the stream of the enhancement layer.

(30)
The image encoding device according to (29), wherein the base layer encoding section generates the stream of the base layer according to a coding scheme which does not support the tile partitioning.

(31)
The image encoding device according to (30), wherein the encoding section generates the stream of the enhancement layer according to an HEVC (High Efficiency Video Coding) scheme. The base layer encoding section generates the stream of the base layer according to an MPEG2 scheme or an AVC (Advanced Video Coding) scheme.

(32)

An image encoding method including:

partitioning an image into a plurality of tiles including a region-of-interest tile; and inserting a first parameter indicating which tile is the region-of-interest tile into an encoded stream generated by encoding the image for each of the tiles.

REFERENCE SIGNS LIST 1, 10 image encoding device
3 multiplexing section
12 tile partitioning section
16, 16a, 16b lossless encoding section
30, 30a, 30b intra prediction section
35, 35a, 35b inter prediction section
40, 40a, 40b prediction control section
6, 60 image decoding device
8 combining section
63, 63a, 63b lossless decoding section
69, 9 resolution adjustment section
80 intra prediction section
85 inter prediction section
90 determination section

The invention claimed is:

1. An image decoding device comprising:
circuitry configured to
acquire a first parameter indicating a specific tile from an encoded stream encoded by partitioning a target image into a plurality of tiles, and a second parameter relating to whether or not a pixel of a non-specific tile is used as a reference pixel in the specific tile,
perform inter prediction in the specific tile of the target image in which the pixel in the non-specific tile of a reference image is prohibited from being used as the reference pixel based on the second parameter,
decode the encoded stream based on an inter prediction image generated by performing inter prediction, the encoded stream being a stream of an enhancement layer in which image data of the specific tile is omitted to generate image data of the non-specific tile, and
decode a stream of a base layer to generate the image data of the specific tile.

2. The image decoding device according to claim 1, wherein the circuitry acquires the first parameter from an SPS (Sequence Parameter Set) or a PPS (Picture Parameter Set) of the encoded stream.

3. The image decoding device according to claim 1, wherein the circuitry acquires the first parameter from an SEI (Supplemental Enhancement Information) of the encoded stream.

4. The image decoding device according to claim 1, wherein the circuitry acquires the first parameter from a slice header of the encoded stream.

5. The image decoding device according to claim 1, wherein the target image is partitioned into the plurality of tiles at the time of encoding according to a position of the specific tile set in the target image.

6. The image decoding device according to claim 5, wherein the specific tile is a tile including a human region detected in each image.

7. The image decoding device according to claim 1, wherein the circuitry is further configured to cancel an offset which is dependent on a position of the specific tile and is an offset of motion vector information acquired from the encoded stream and perform inter prediction based on the motion vector information of which the offset is cancelled.

8. The image decoding device according to claim 1, wherein the circuitry decodes the specific tile without decoding the non-specific tile when partial decoding is performed.

9. The image decoding device according to claim 1, wherein the circuitry is further configured to
combine the image data of the specific tile and the image data of the non-specific tile to restore the target image.

10. The image decoding device according to claim 9, wherein the circuitry decodes the stream of the base layer according to a coding scheme which does not support tile partitioning.

11. The image decoding device according to claim 10, wherein the circuitry
decodes the stream of the enhancement layer according to an HEVC (High Efficiency Video Coding) scheme, and
decodes the stream of the base layer according to an MPEG2 scheme or an AVC (Advanced Video Coding) scheme.

12. The image decoding device according to claim 8, wherein
the circuitry is further configured to determine whether partial decoding is performed according to performance or a kind of device, a communication bandwidth, or user designation, and
only the specific tile of the target image is decoded when the circuitry determines that the partial decoding is performed.

13. The image decoding device according to claim 12, the circuitry is further configured to generate a display image by increasing a resolution of a decoded image of the specific tile generated through the partial decoding.

14. The image decoding device according to claim 12, wherein the circuitry is further configured to generate a display image by decreasing a resolution of a decoded image of the specific tile and the non-specific tile generated through entire decoding.

15. An image decoding method comprising:
acquiring a first parameter indicating a specific tile from an encoded stream encoded by partitioning a target image into a plurality of tiles, and a second parameter relating to whether or not a pixel of a non-specific tile is used as a reference pixel in the specific tile;
performing, via circuitry, inter prediction in the specific tile of the target image in which the pixel in the non-specific tile of a reference image is prohibited from being used as the reference pixel based on the second parameter;
decoding the encoded stream based on an inter prediction image generated by performing inter prediction, the encoded stream being a stream of an enhancement layer in which image data of the specific tile is omitted to generate image data of the non-specific tile, and
decoding a stream of a base layer to generate the image data of the specific tile.

16. An image encoding device comprising:
circuitry configured to
partition a target image into a plurality of tiles including a specific tile,
perform inter prediction in the specific tile of the target image in which a pixel in a non-specific tile of a reference image is prohibited from being used as a reference pixel based on a second parameter, the second parameter relating to whether or not the pixel of the non-specific tile is used as the reference pixel in the specific tile, insert a first parameter indicating the specific tile into an encoded stream generated by encoding the target image for each of the tiles, the encoded stream being a stream of an enhancement layer in which image data of the specific tile is omitted to generate image data of the non-specific tile, and encode a stream of a base layer to generate the image data of the specific tile.

17. The image encoding device according to claim 16, wherein the circuitry inserts the first parameter into an SPS (Sequence Parameter Set) or a PPS (Picture Parameter Set) of the encoded stream.

18. The image encoding device according to claim 16, wherein the second parameter indicates that the region-of-interest tile is included in each image into the encoded stream.

19. An image encoding method comprising:

partitioning a target image into a plurality of tiles including a specific tile;

performing, via circuitry, inter prediction in the specific tile of the target image in which a pixel in a non-specific tile of a reference image is prohibited from being used as a reference pixel and a pixel in the specific tile of the reference image is permitted to be used as the reference pixel based on a second parameter, the second parameter relating to whether or not the pixel of the non-specific tile is used as the reference pixel in the specific tile; and inserting a first parameter indicating the specific tile into an encoded stream generated by encoding the target image for each of the tiles, the encoded stream being a stream of an enhancement layer in which image data of the specific tile is omitted to generate image data of the non-specific tile; and encoding a stream of a base layer to generate the image data of the specific tile.

* * * * *